United States Patent
Schultz et al.

(10) Patent No.: US 10,975,643 B2
(45) Date of Patent: Apr. 13, 2021

(54) DOWNHOLE DISCONNECT TOOL

(71) Applicant: THRU TUBING SOLUTIONS, INC., Oklahoma City, OK (US)

(72) Inventors: Roger L. Schultz, Newcastle, OK (US); Brock W. Watson, Sadler, TX (US); Andrew M. Ferguson, Moore, OK (US); Gregory A. Kliewer, Edmond, OK (US); Mark S. Britton, Carter, OK (US)

(73) Assignee: Thru Tubing Solutions, Inc., Oklahoma City, OK (US)

( * ) Notice: Subject to any disclaimer, the term of this patent is extended or adjusted under 35 U.S.C. 154(b) by 0 days.

(21) Appl. No.: 16/441,083

(22) Filed: Jun. 14, 2019

(65) Prior Publication Data
US 2020/0291734 A1 Sep. 17, 2020

Related U.S. Application Data

(60) Provisional application No. 62/818,045, filed on Mar. 13, 2019.

(51) Int. Cl.
*E21B 10/64* (2006.01)
*E21B 17/02* (2006.01)
(Continued)

(52) U.S. Cl.
CPC .............. *E21B 23/04* (2013.01); *E21B 10/64* (2013.01); *E21B 17/023* (2013.01); *E21B 17/06* (2013.01); *F16L 29/04* (2013.01)

(58) Field of Classification Search
CPC ........ E21B 10/64; E21B 17/023; E21B 17/06; E21B 23/04; E21B 29/00; E21B 29/002; F16L 29/04
See application file for complete search history.

(56) References Cited

U.S. PATENT DOCUMENTS

| 5,501,099 A | * | 3/1996 | Whorff | ................. G01F 1/3209 73/29.01 |
| 6,564,868 B1 | | 5/2003 | Ferguson et al. | |

(Continued)

OTHER PUBLICATIONS

Thru Tubing Solutions; "Nitro Tuff Abrasive Cutter", Abrasive Cutting and Perforating Technology article, p. 22, dated 2015, 1 page.

(Continued)

*Primary Examiner* — Matthew R Buck
(74) *Attorney, Agent, or Firm* — Smith IP Services, P.C.

(57) ABSTRACT

A system can include a disconnect tool connected as part of a tubular string, the disconnect tool including an outer housing, and an inner mandrel in the outer housing, in which an abrasive slurry is directed to flow through the tubular string and from the inner mandrel to an annulus between the inner mandrel and the outer housing, and the abrasive slurry erodes through the outer housing. A method can include installing a tubular string in a well, then deploying a disconnect assembly into the tubular string, and flowing an abrasive slurry through the disconnect assembly, thereby parting the tubular string. A disconnect tool can include a rotational flow structure configured to induce rotational flow, and an inner diameter decrease downstream of the rotational flow structure.

16 Claims, 18 Drawing Sheets

(51) Int. Cl.
  *E21B 17/06* (2006.01)
  *E21B 23/04* (2006.01)
  *E21B 29/00* (2006.01)
  *F16L 29/04* (2006.01)

(56) References Cited

U.S. PATENT DOCUMENTS

| | | | |
|---|---|---|---|
| 6,854,341 B2* | 2/2005 | Oddie | G01F 1/34 |
| | | | 73/861.52 |
| 8,020,619 B1 | 9/2011 | Robertson et al. | |
| 8,678,079 B2* | 3/2014 | Clem | E21B 17/22 |
| | | | 166/222 |
| 8,936,088 B2* | 1/2015 | Misselbrook | E21B 29/00 |
| | | | 166/298 |
| 9,745,813 B2* | 8/2017 | Robertson | E21B 29/005 |
| 2004/0089450 A1* | 5/2004 | Slade | B24C 1/045 |
| | | | 166/298 |
| 2005/0051323 A1 | 3/2005 | Fripp et al. | |
| 2006/0201675 A1 | 9/2006 | Ferguson et al. | |
| 2011/0284224 A1* | 11/2011 | Misselbrook | E21B 43/114 |
| | | | 166/298 |
| 2012/0018158 A1 | 1/2012 | Misselbrook et al. | |
| 2012/0031615 A1* | 2/2012 | Connell | E21B 43/114 |
| | | | 166/298 |
| 2014/0034315 A1* | 2/2014 | Tallini | E21B 29/02 |
| | | | 166/297 |
| 2016/0215580 A1* | 7/2016 | Lehr | E21B 29/002 |
| 2017/0030156 A1* | 2/2017 | Churchill | E21B 33/138 |
| 2017/0037707 A1* | 2/2017 | Churchill | E21B 29/00 |
| 2017/0145765 A1* | 5/2017 | Umphries | E21B 29/00 |

OTHER PUBLICATIONS

Thru Tubing Solutions; "Nitro Tuff Abrasive Perforator", Abrasive Cutting and Perforating Technology article, p. 20, dated 2015, 1 page.
Thru Tubing Solutions; "Circulating Sub", Coiled Tubing Conveyed Support Tools article, p. 70, dated 2015, 1 page.
Thru Tubing Solutions; "Hydraulic Disconnect", Coiled Tubing Conveyed Support Tools article, p. 66, dated 2015, 1 page.
International Search Report with Written Opinion dated Jun. 26, 2020 for PCT Patent Application No. PCT/US2020/021517, 12 pages.

* cited by examiner

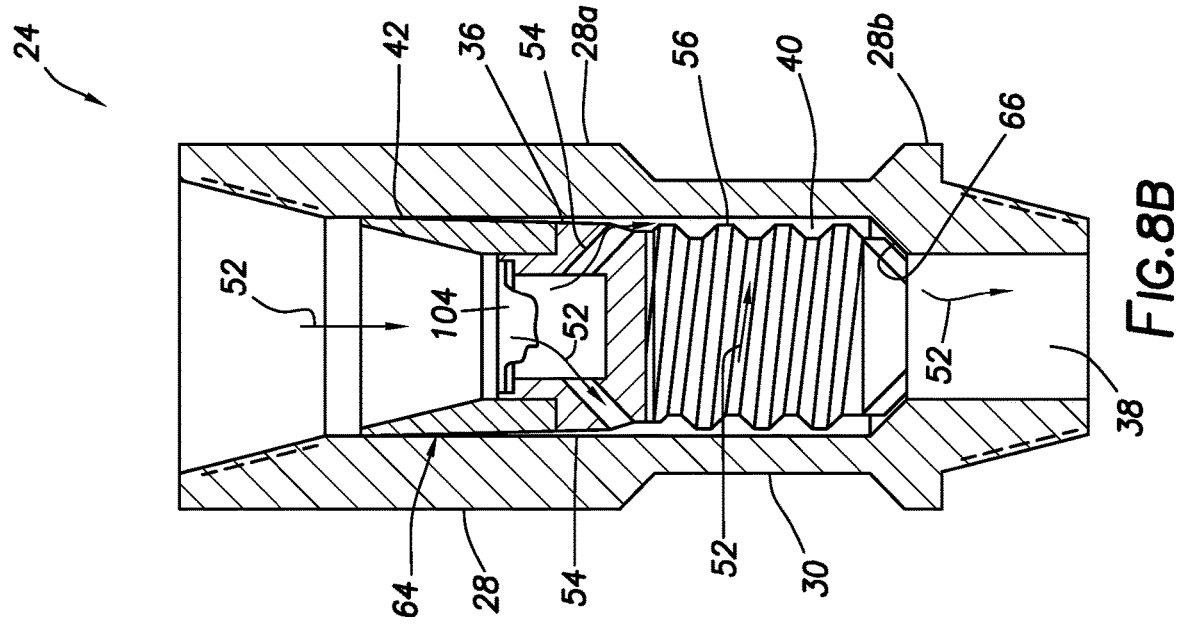
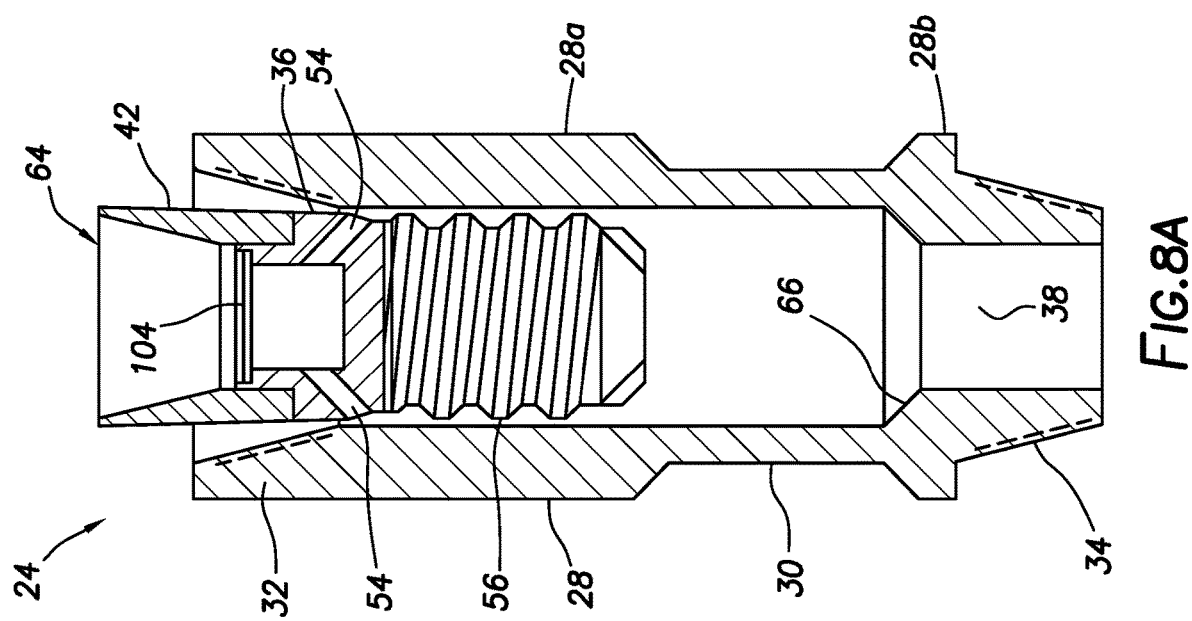

DOWNHOLE DISCONNECT TOOL

CROSS-REFERENCE TO RELATED APPLICATION

This application claims the benefit of the filing date of U.S. provisional application No. 62/818,045 filed on 13 Mar. 2019. The entire disclosure of this prior application is incorporated herein by this reference.

BACKGROUND

This disclosure relates generally to equipment utilized and operations performed in conjunction with a subterranean well and, in an example described below, more particularly provides a downhole disconnect tool and associated methods.

It can be important to have the capability of disconnecting a section (such as a bottom hole assembly) from a tubular string in a well. For example, if the bottom hole assembly or other section of the tubular string becomes stuck in the well, disconnecting that stuck section from the remainder of the tubular string allows the remainder of the tubular string to be retrieved from the well.

It will, therefore, be readily appreciated that improvements are continually needed in the arts of designing, constructing and utilizing downhole disconnect tools. Such improvements may be useful in a wide variety of different well situations and conditions.

BRIEF DESCRIPTION OF THE DRAWINGS

FIGS. 8A & B are representative cross-sectional views of another example of the disconnect tool.

DETAILED DESCRIPTION

Figure 1:
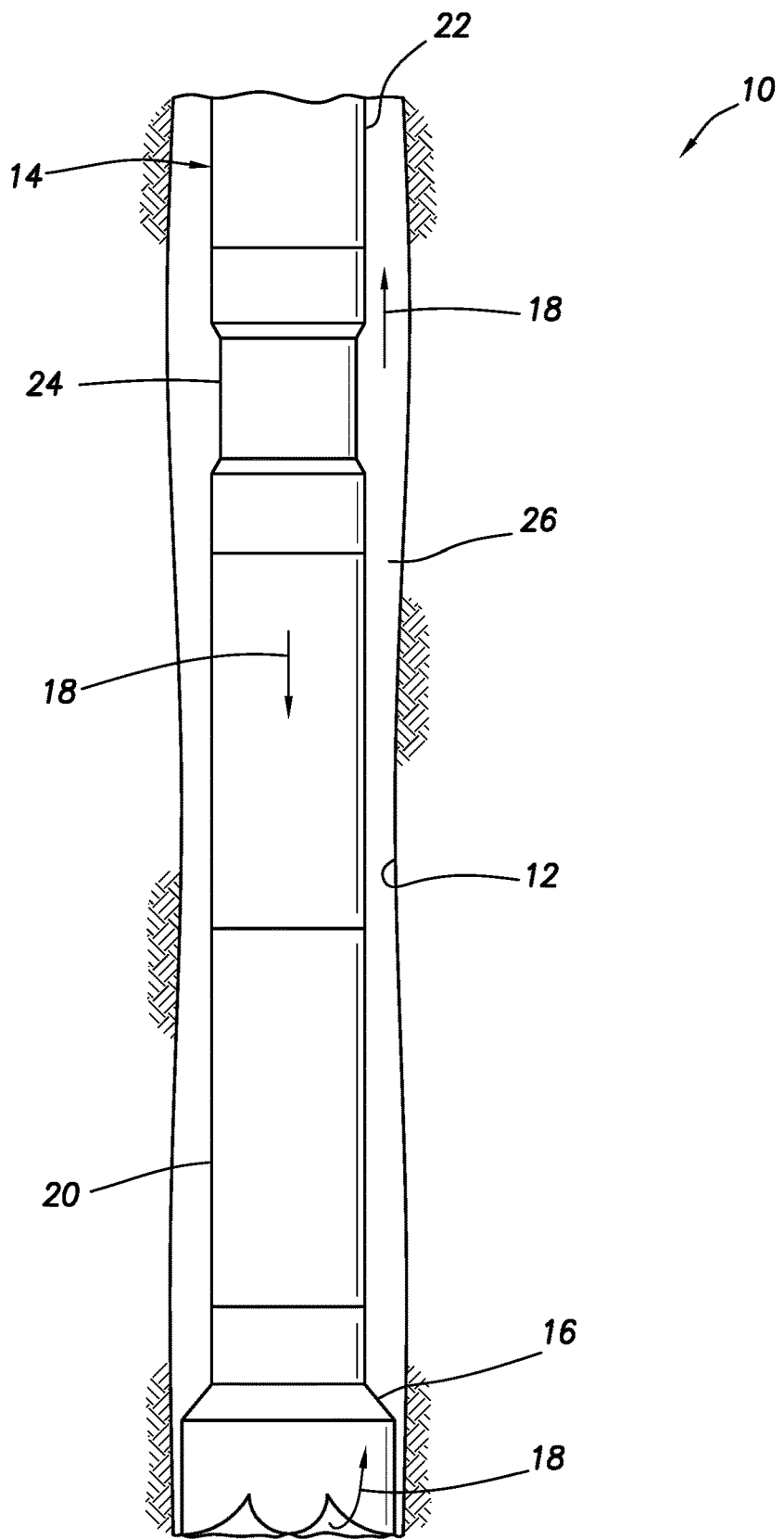
FIG. 1 is a representative partially cross-sectional view of an example of a well system and associated method which can embody principles of this disclosure.

Representatively illustrated in FIG. 1 is a system 10 for use with a subterranean well, and an associated method, which can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the FIG. 1 example, a wellbore 12 is being drilled using a tubular drill string 14. For this purpose, the drill string 14 includes a drill bit 16 connected at a distal end of the drill string. The drill bit 16 may be rotated to drill the wellbore 12 deeper, for example, by rotating the drill string 14 from the surface (e.g., using a rotary table or top drive of a land- or water-based drilling rig), and/or by flowing drilling fluid 18 through a drilling motor 20 connected in the drill string above the drill bit. The drilling motor 20 could be a positive-displacement or Moineau-type drilling motor, or a turbine-type drilling motor.

The drilling fluid 18 is flowed through the drill string 14 (e.g., using rig mud pumps at surface). The drilling fluid 18 exits the distal end of the drill string 14 via nozzles in the drill bit 16 and returns to the surface via an annulus 26 formed between the drill string and the wellbore 12.

The drill string 14 may comprise one or more tubulars 22 extending to surface. The tubulars 22 could include individual connected-together drill pipes, or a continuous tubular of the type known to those skilled in the art as coiled tubing. Any type of tubular(s) may be used in the drill string 14 in keeping with the principles of this disclosure.

In order to allow the tubulars 22 to be retrieved from the wellbore 12 in the event that the drill bit 16, drilling motor 20 and/or other components of the drill string 14 become stuck in the wellbore during the drilling operation, a disconnect tool 24 is connected between the tubulars and the remainder of the bottom hole assembly (including the drilling motor and the drill bit in this example). The disconnect tool 24 may be connected at any position along the drill string 14, multiple disconnect tools may be connected in the drill string, and a disconnect tool may be connected between any other components of the drill string, in keeping with the principles of this disclosure.

After the disconnect tool 24 has been used to separate upper and lower portions of the drill string 14, the upper portion can be withdrawn from the wellbore 12 to the surface. The lower portion can then be retrieved from the wellbore 12, for example, using specialized "fishing" tools of the type well known to those skilled in the art.

Although a drilling operation is described above as an example of a well operation that can benefit from the principles of this disclosure, the scope of this disclosure is not limited to use with drilling operations. Other types of well operations (such as, completions, stimulation or other treatment, rework, etc.) could utilize the principles of this disclosure. In these other types of well operations, the disconnect tool may be used to part tubulars in tubular strings other than drill strings (for example, completion strings, production tubing strings, injection or treatment strings, etc.).

Figure 2:
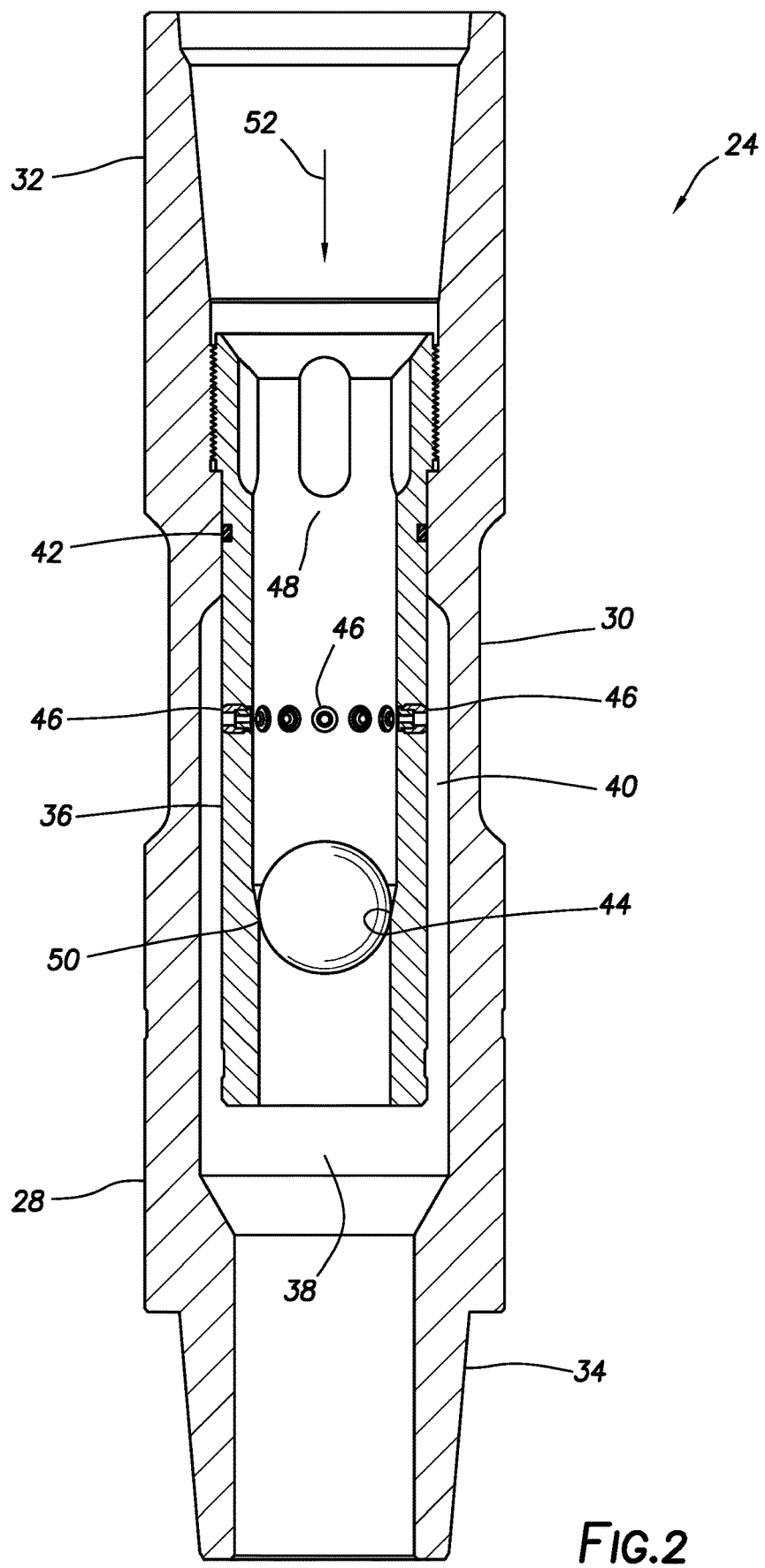
FIG. 2 is a representative cross-sectional view of an example of a disconnect tool that may be used in the FIG. 1 system and method, and which can embody the principles of this disclosure.

Referring additionally now to FIG. 2, a cross-sectional view of an example of the disconnect tool 24 is representatively illustrated, apart from the remainder of the well system 10. For convenience, the disconnect tool 24 is described below as it may be used in the FIG. 1 system 10 and method. However, the disconnect tool 24 may be used with other systems and methods in keeping with the principles of this disclosure.

In the FIG. 2 example, the disconnect tool 24 includes an outer generally tubular housing 28 configured to be connected in the drill string 14 (or other type of tubular string), for example, by threading. A reduced cross-section area 30 is provided as part of the outer housing 28 between upper and lower threaded connectors 32, 34 in this example.

A generally tubular inner mandrel 36 is threadedly secured in an interior flow passage 38 of the outer housing 28, so that an annulus 40 is formed radially between the inner mandrel and the reduced cross-section area 30. When connected in the drill string 14 in the FIG. 1 system 10, the flow passage 38 extends longitudinally through the drill string 14. A seal 42 seals between the inner mandrel 36 and the outer housing 28 above the annulus 40.

The inner mandrel 36 has a seat 44 formed therein below a series of circumferentially distributed and spaced apart nozzles 46. Initially, during drilling operations, the drilling fluid 18 can flow through the flow passage 38 (including an inner flow passage 48 of the inner mandrel 36) to components (such as, the drilling motor 20 and drill bit 16) connected below the disconnect tool 24.

When it is desired to disconnect the components connected below the disconnect tool 24 from the remainder of the drill string 14 above the disconnect tool, a plug 50 (such as, a ball or dart) is launched into the drill string. The plug 50 eventually engages the seat 44 in the inner mandrel 36 and seals against the seat, or at least substantially restricts flow through the flow passage 48, so that an abrasive slurry 52 pumped into the drill string from the surface is forced to exit the flow passage 48 via the nozzles 46.

The abrasive slurry 52 may be the same as the drilling fluid 18 described above. Alternatively, the slurry 52 could be a mixture of water and sand, or a mixture of drilling mud and sand. The scope of this disclosure is not limited to use of any particular type of abrasive slurry.

Figure 3:
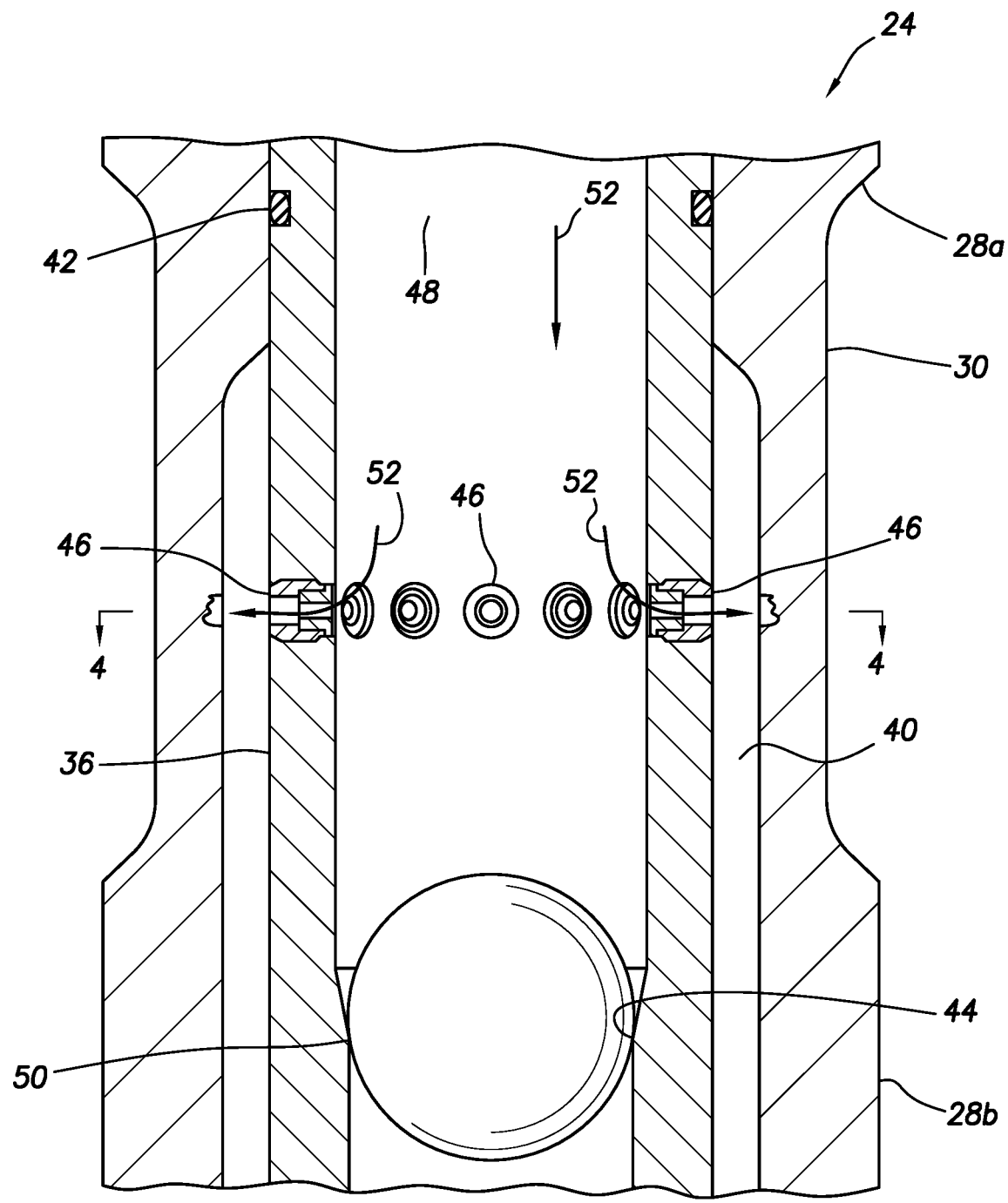
FIG. 3 is a representative cross-sectional view of a portion of the disconnect tool.

The nozzles 46 are configured to substantially increase a flow velocity of the abrasive slurry 52 as it exits the nozzles, so that the slurry impinges on an interior of the reduced cross-section area 30 of the outer housing 28 (see FIG. 3). This causes abrasive wear of the reduced cross-section area 30, and eventually the reduced cross-section area 30 is worn through, so that it separates or parts.

The reduced cross-section area 30 may be eroded through completely or partially by the abrasive slurry 52. If the reduced cross-section area 30 is partially eroded through, a tensile force may then be applied to the upper outer housing 28 (for example by picking up at surface on the tubular string connected to the upper connector 32), in order to fully part the reduced cross-section area.

An upper portion 28a of the outer housing 28 (above the reduced cross-section area 30) can now be retrieved with the remainder of the drill string 14 thereabove to the surface. A lower portion 28b of the outer housing 28 will remain with the lower bottom hole assembly and any tubulars connected below the disconnect tool 24 for later retrieval (e.g., using fishing tools as mentioned above).

As depicted in FIG. 3, the nozzles 46 are configured to direct the abrasive slurry 52 directly radially outward to impinge on the interior of the reduced cross-section area 30. In other examples, the nozzles 46 could be canted or angled (see FIGS. 4 & 5), so that the abrasive slurry 52 is directed in a spiraling, helical, rotary or vortical flow as it exits the nozzles.

Figure 4:
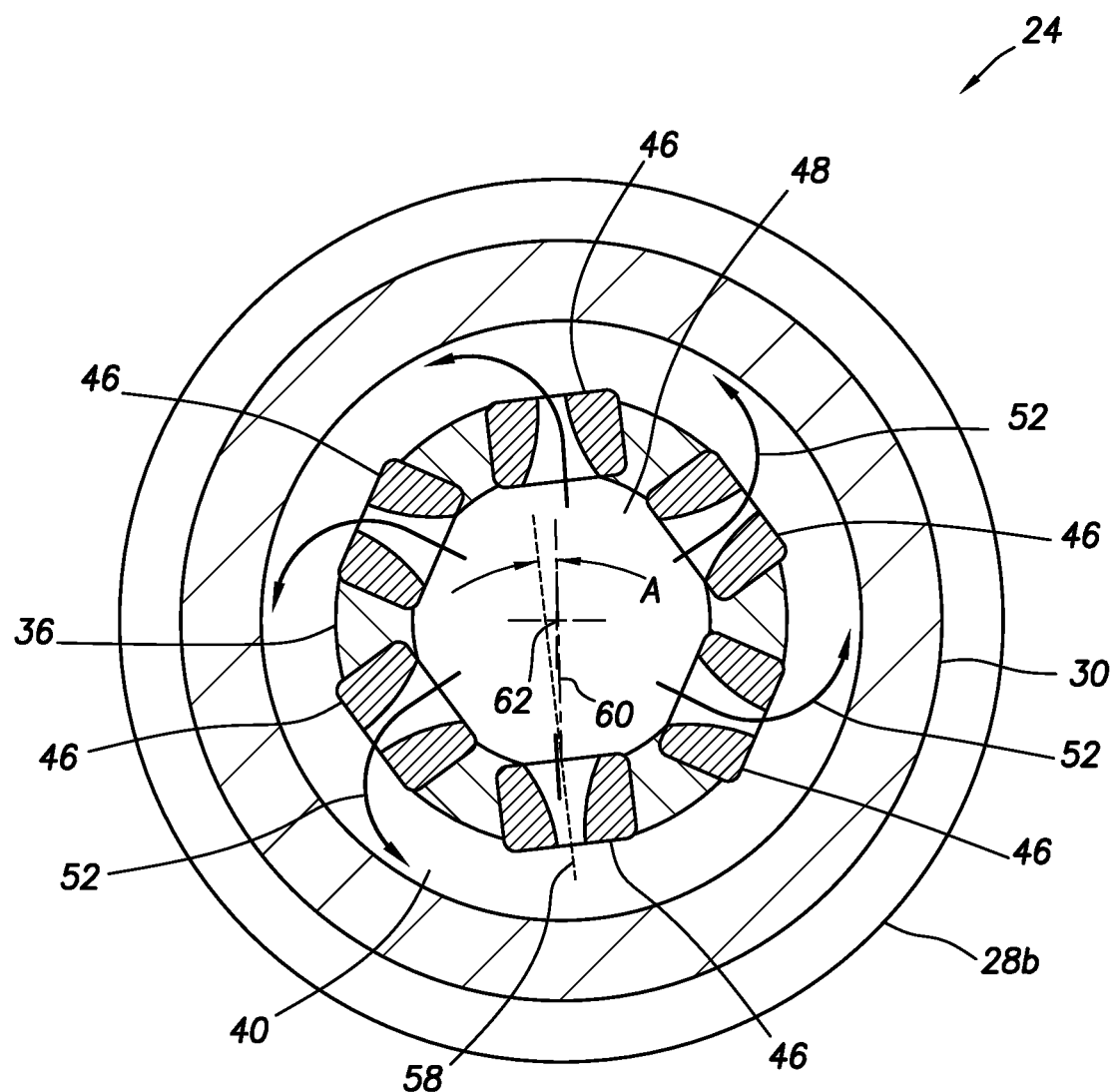
FIG. 4 is a representative cross-sectional view of the disconnect tool, taken along line 4-4 of FIG. 3.

In FIG. 4, another example of the disconnect tool 24 is representatively illustrated, in which six nozzles 46 are provided in the inner mandrel 36. A central axis 58 of each nozzle 46 is angularly offset (by angle A) relative to a radial line 60 (intersecting a center 62 of the flow passage 48). This angular offset A induces helical, rotary or vortical flow of the abrasive slurry 52 in the annulus 40 and the abrasive slurry thereby more evenly impinges on the reduced cross-section area 30 about its internal circumference.

Figure 5:
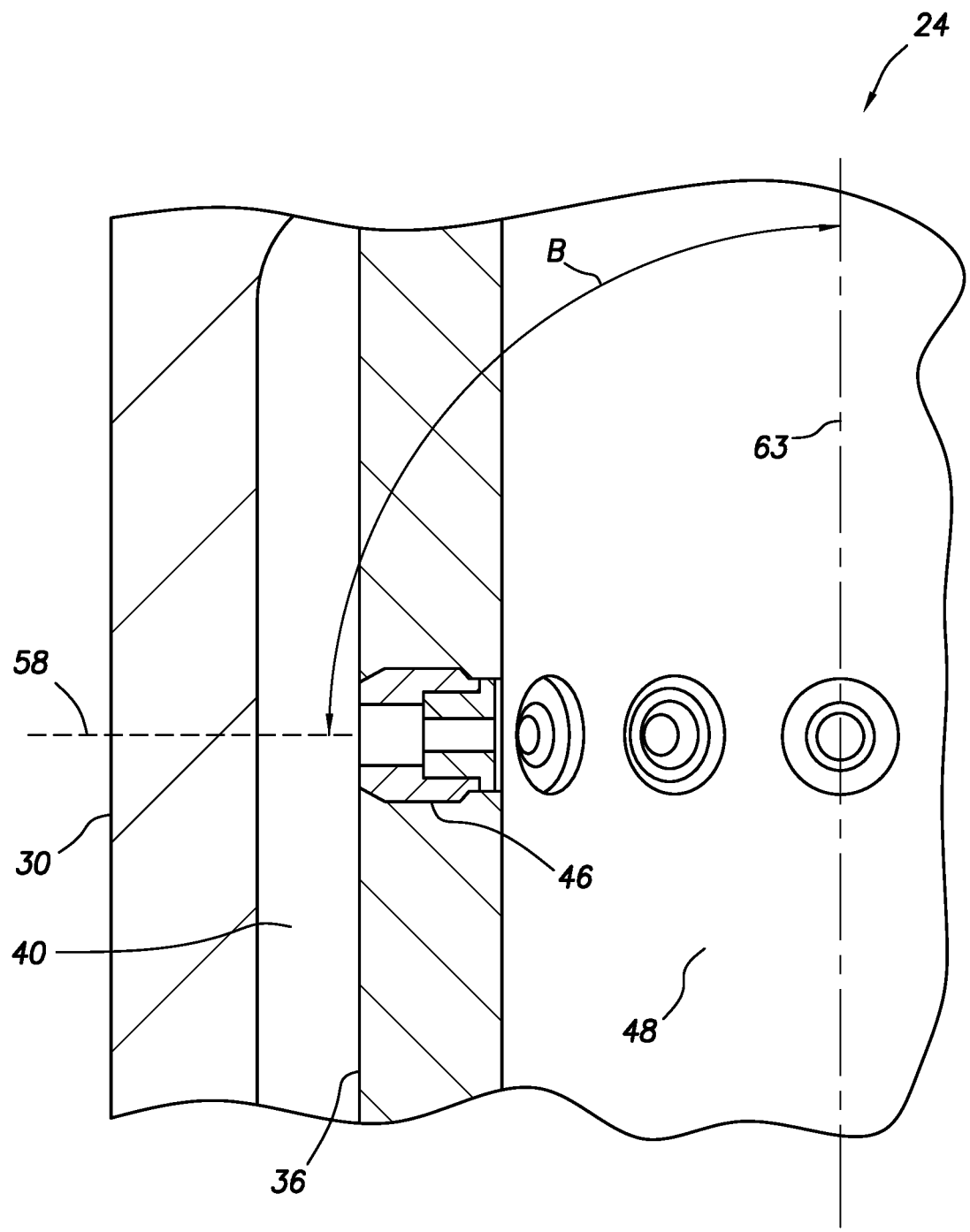
FIG. 5 is a representative cross-sectional view of a portion of the disconnect tool.

In FIG. 5, another example of the disconnect tool 24 is representatively illustrated, in which the nozzle central axis 58 is angularly offset from a central longitudinal axis 63 of the flow passage 48 by an angle B. The angle B could be selected to direct the abrasive slurry 52 in a desired direction as it exits the nozzle 46. For example, the angle B could be greater than 90 degrees to direct the abrasive slurry 52 downward in the annulus 40.

Other angular offsets may be used with the nozzles 46. For example, if the angular offsets A & B are combined, the abrasive slurry 52 can be directed in a downward helical, rotary or vortical flow in the annulus 40. Thus, the scope of this disclosure is not limited to any particular angular offsets, any particular combination of angular offsets, or to use of angular offsets at all.

Alternatively, the inner mandrel 36 could be mounted on bearings, so that the nozzles 46 rotate when the plug 50 engages the seat 44 and the abrasive slurry 52 is pumped through the tool 24. In this manner, the abrasive wear caused by the slurry 52 can be circumferentially distributed more evenly about the internal circumference of the reduced cross-section area 30.

Figure 6:
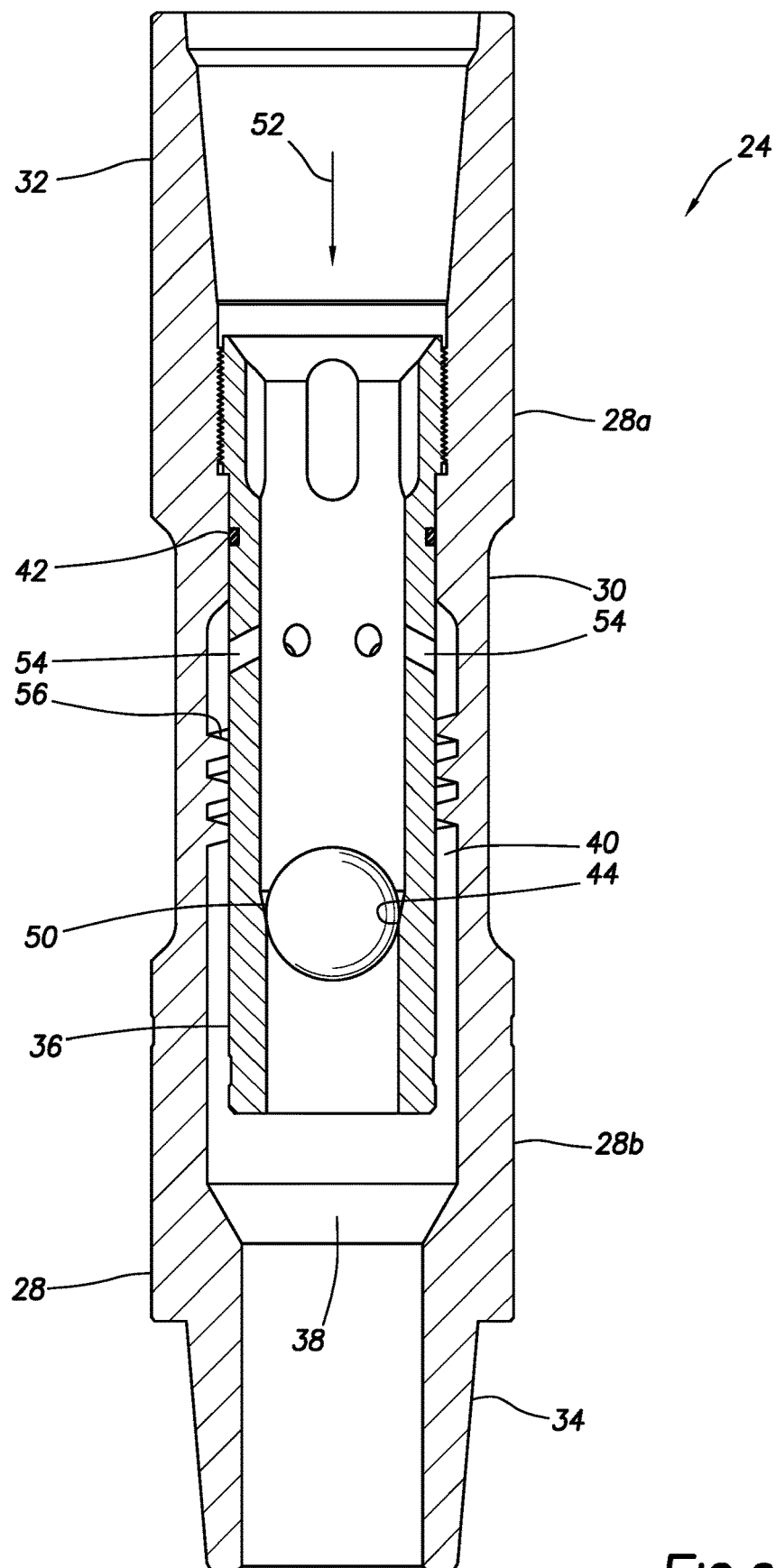
FIG. 6 is a representative cross-sectional view of another example of the disconnect tool.

Referring additionally now to FIG. 6, another example of the disconnect tool 24 is representatively illustrated. In this example, the nozzles 46 are not used. Instead, ports 54 are formed through the inner mandrel 36, so that, after the plug 50 engages the seat 44, the abrasive slurry 52 is directed outward through the ports and into the annulus 40 between the inner mandrel and the reduced cross-section area 30 of the outer housing 28.

The flow velocity of the abrasive slurry 52 is not necessarily increased substantially as the slurry exits the ports 54, but the ports could be configured to increase the velocity of the slurry substantially if desired. In any event, the slurry 52 impinges on the interior surface of the reduced cross-section area 30 after it exits the ports 54.

One or more helical vanes 56 are positioned in the annulus 40. The vanes 56 are one example of a variety of different types of rotational flow structures that may be used to induce rotational flow in the slurry 52. The nozzles 46 described above can induce rotational flow in the slurry 52 when the nozzles are appropriately angled or canted. Separate vanes, airfoils, deflecting bodies, etc. may be used in place of the helical vanes 56, if desired.

In the FIG. 3 example, the vanes 56 are formed in the outer housing 28 and extend inwardly into the annulus 40. In other examples, the vanes 56 could be formed on an exterior of the inner mandrel 36 or otherwise positioned in the annulus 40.

Figure 7:
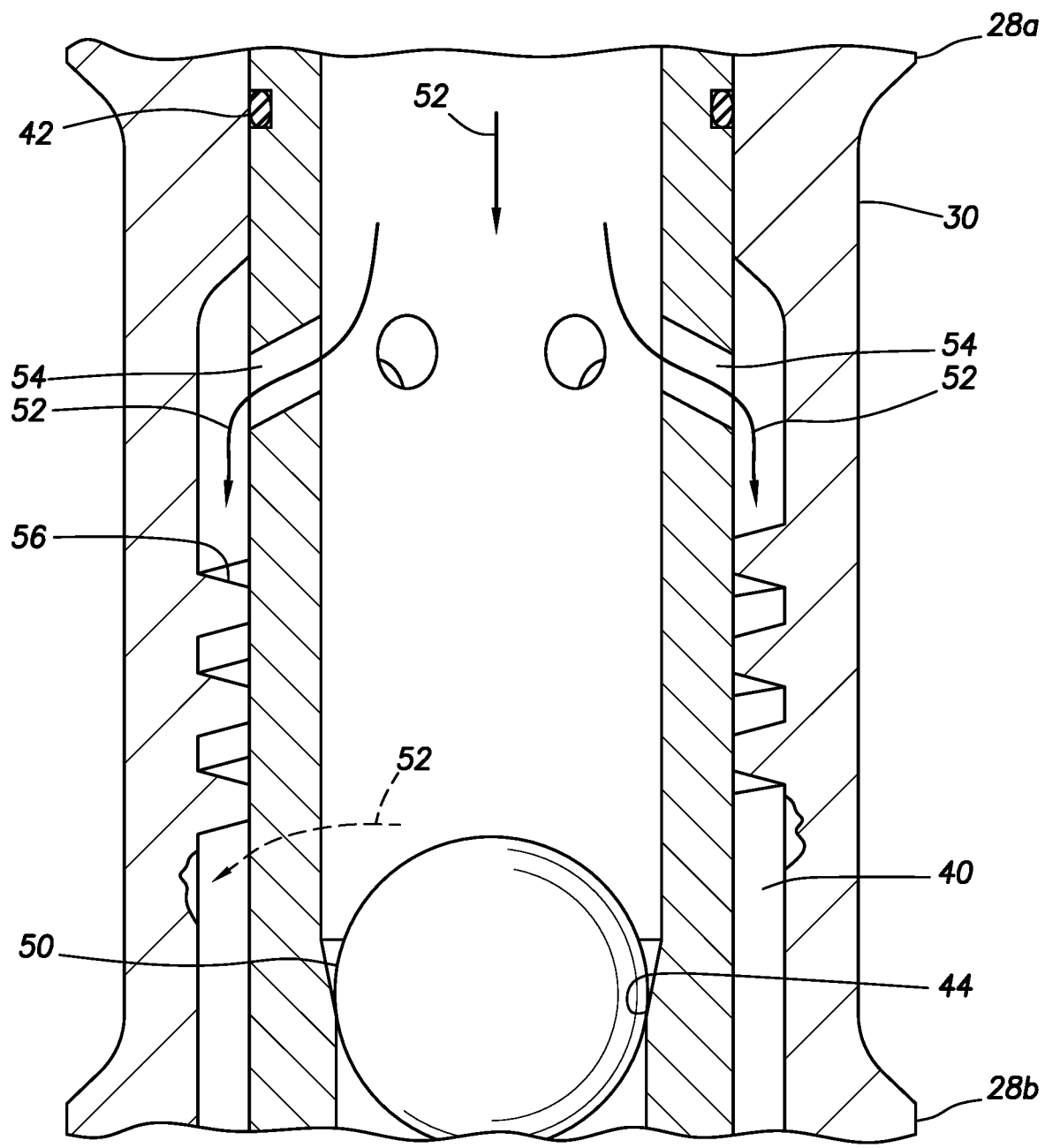
FIG. 7 is a representative cross-sectional view of a portion of the FIG. 6 disconnect tool.

Referring additionally now to FIG. 7, the vanes 56 induce spiraling, helical, rotary or vortical flow of the abrasive slurry 52 in the annulus 40, so that the abrasive wear caused by the slurry on the reduced cross-section area 30 is circumferentially distributed more evenly. Eventually, the reduced cross-section area 30 is worn through, so that it separates or parts.

The reduced cross-section area 30 may be eroded through completely or partially by the abrasive slurry 52. If the reduced cross-section area 30 is partially eroded, a force may be applied to the upper portion 28a of outer housing 28 (for example by picking up at surface on the tubular string connected to the upper connector 32), in order to fully part the reduced cross-section area.

The upper portion 28a of the outer housing 28 (above the reduced cross-section area 30) can now be retrieved with the remainder of the drill string 14 thereabove to the surface. A lower portion 28b of the outer housing 28 will remain with the lower bottom hole assembly (e.g., including the drill bit 16 and drilling motor 20) and any other tubulars for later retrieval (e.g., using fishing tools as mentioned above).

Note that the reduced cross-section area 30 may be eroded through at the vanes 56 and/or downstream of the vanes (as depicted in FIG. 7). The scope of this disclosure is not limited to any particular location at which the outer housing 28 is eroded through.

If the outer housing 28 is eroded through between the vanes 56, a helical piece of the outer housing could remain connecting the upper and lower sections 28a,b after the abrasive slurry 52 is flowed through the annulus 40. In that case, the helical piece can be parted by applying a tensile force and/or rotary torque to the upper section 28a of the outer housing 28.

Referring additionally now to FIGS. 8A & B, cross-sectional views of another example of the disconnect tool 24 are representatively illustrated, apart from the remainder of the FIG. 1 system 10. In FIG. 8A, the disconnect tool 24 is depicted prior to installation of the inner mandrel 36 in the outer housing 28. In FIG. 8B, the disconnect tool 24 is depicted after installation of the inner mandrel 36 in the outer housing 28, and with the abrasive slurry 52 flowing through the tool.

In the FIGS. 8A & B example, the outer housing 28 is separately connected in the drill string 14 or other tubular string (e.g., using the connectors 32, 34). It may be desirable, for example to connect the disconnect tool 24 above a bottom hole assembly, and/or at one or more additional positions along the length of the tubular string (such as, between adjacent tubulars 22). The outer housing 28 can be connected in a tubular string at any position or positions where it may be desired to part the tubular string.

As depicted in FIGS. 8A & B, the inner mandrel 36 is deployed into the outer housing 28 after the tubular string is installed in a well. In this example, the inner mandrel 36 is part of a disconnect assembly 64 separately deployed into the outer housing 28 when it is desired to cut through the reduced cross-section area 30 of the outer housing, in order to disconnect sections of the tubular string connected to the upper and lower portions 28a,b of the outer housing.

The disconnect assembly 64 could be deployed into the tubular string using any of a variety of different methods. For example, the assembly 64 could be displaced through the tubular string to the outer housing 28 by fluid flow through the tubular string. The seal 42 could be configured to enhance this displacement by fluid flow (e.g., being shaped as an upwardly opening cup seal as depicted in FIGS. 8A & B).

In the outer housing 28, the assembly 64 eventually engages an internal profile 66 (such as a shoulder) formed in the outer housing 28. This prevents further downward displacement of the assembly 64 relative to the outer housing 28.

A rupture disk 104 initially prevents flow of fluid into the disconnect assembly 64. However, once the assembly 64 has been landed in the outer housing 28, a sufficient pressure differential can be created across the rupture disk 104 to open it and thereby allow fluid flow into the assembly.

Note that the vanes 56 are formed externally on the inner mandrel 36 in the FIGS. 8A & B example. When the assembly 64 engages the profile 66, the vanes 56 are aligned with the reduced cross-section area 30 of the outer housing 28.

In this configuration (FIG. 8B), the seal 42 seals between the inner mandrel 36 and the outer housing 28. The ports 54 provide fluid communication between the flow passage 38 above the assembly 64 and the annulus 40 formed between the inner mandrel 36 and the outer housing 28.

Thus, when the abrasive slurry 52 is flowed through the flow passage 38, the ports 54 divert the slurry into the annulus 40, where the vanes 56 induce rotational or rotary flow of the slurry. This rotary, helical or vortical flow of the slurry 52 impinges on the inner surface of the reduced cross-section area 30, thereby evenly eroding through the reduced cross-section area. The upper and lower portions 28a,b of the outer housing 28 can then be separated.

The reduced cross-section area 30 may be eroded through completely or partially by the abrasive slurry 52. If the reduced cross-section area 30 is partially eroded, a force may be applied to the upper portion 28a of outer housing 28 (for example by picking up at surface on the tubular string connected to the upper connector 32), in order to fully part the reduced cross-section area.

Figure 9:
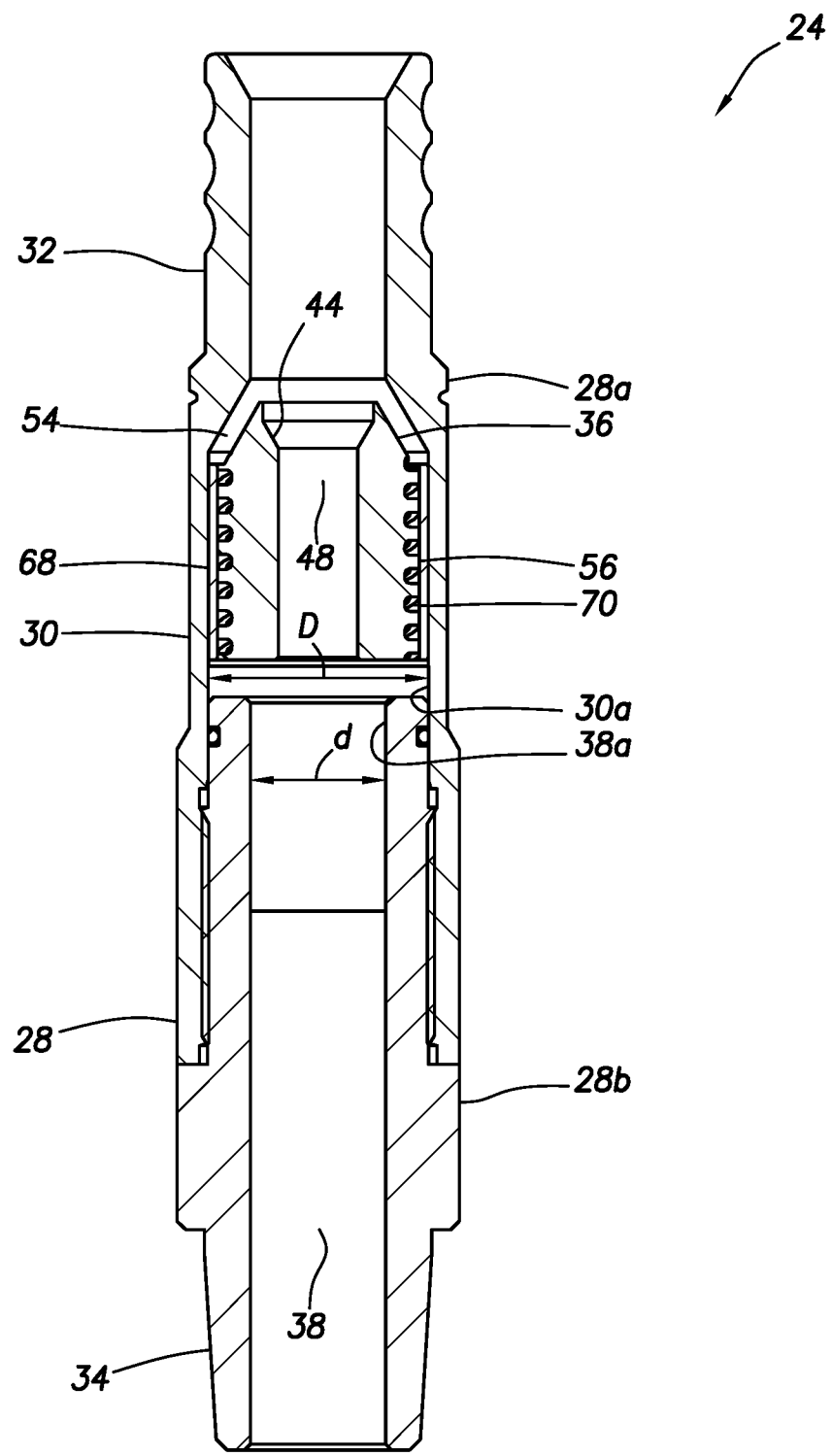
FIG. 9 is a representative cross-sectional view of another example of the disconnect tool.

Referring additionally now to FIG. 9, a cross-sectional view of another example of the disconnect tool 24 is representatively illustrated. In this example, the upper connector 32 is configured for insertion into, and welding to, a tubular 22 (see FIG. 1). The FIG. 9 connector 32 may be used for any of the connectors described herein or depicted in the drawings.

In the FIG. 9 configuration, the disconnect tool 24 is suited for connection between a tubular 22 and a threaded upper connector of a bottom hole assembly of a tubular string. In this manner, the bottom hole assembly can be conveniently disconnected from the remainder of the tubular string. However, it is not necessary for the FIG. 9 disconnect tool 24 to be configured or used in this manner.

In the FIG. 9 example, the vanes 56 are formed externally on the inner mandrel 36. A sleeve 68 is interposed between the vanes 56 and the outer housing 28, in order to more efficiently induce rotary flow of the slurry 52 and reduce erosion of the outer housing in this area. For this purpose, the sleeve 68 may be made of a highly erosion resistant material.

The sleeve 68 does not extend over or protect an inner surface 30a of the reduced cross-section area 30 positioned longitudinally between the vanes 56 and a reduced diameter section 38a of the flow passage 38. As depicted in FIG. 9, the inner surface 30a of the reduced cross-section area 30 has an inner diameter D that is larger than an inner diameter d of the flow passage section 38a.

When it is desired to disconnect the upper portion 28a of the outer housing 28 from the lower portion 28b, a plug 50 (see FIGS. 2-3) is deployed into the flow passage 38 above the disconnect tool 24. The plug 50 eventually lands on the seat 44 and thereby diverts flow from the upper flow passage 38 to the vanes 56 via the ports 54 (in the form of a conically shaped annulus between the outer housing 28 and the inner mandrel 36 in FIG. 9).

Abrasive slurry 52 pumped into the upper flow passage 38 above the plug 50 will flow into the vanes 56, that is, into a helical or spiral passage 70 formed radially between the inner mandrel 36 and the sleeve 68, and longitudinally between the vanes 56. Helical, rotary or vortical flow of the abrasive slurry 52 will be produced as the slurry displaces through this helical or spiral passage 70.

The slurry 52 will pass from the helical or spiral passage 70 into the section of the reduced cross-section area 30 having the inner surface 30*a*. At this point, due to the rotational flow of the slurry 52, the slurry will have a certain angular momentum.

Because the section 38*a* of the flow passage 38 has a smaller inner diameter d, in order to pass into the section 38*a*, the angular velocity of the slurry 52 will increase (as required by the principle of conservation of angular momentum). This angular acceleration of the slurry 52 causes it to impinge more forcefully against the inner surface 30*a*, thereby eroding through the reduced cross-section area 30 in a reduced amount of time.

The reduced cross-section area 30 may be eroded through completely or partially by the abrasive slurry 52. If the reduced cross-section area 30 is partially eroded, a force may be applied to the upper portion 28*a* of outer housing 28 (for example by picking up at surface on the tubular string connected to the upper connector 32), in order to fully part the reduced cross-section area.

Figure 10A:
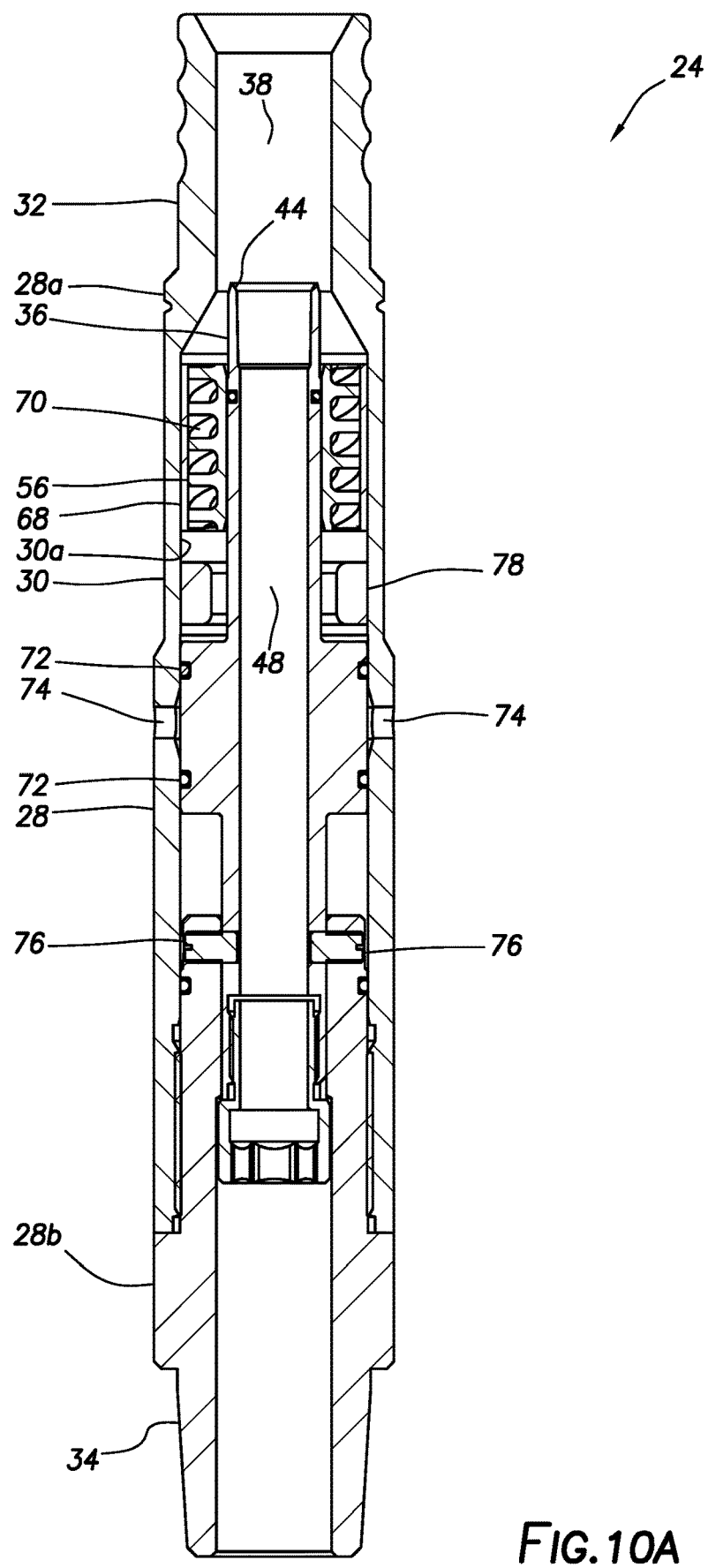
FIGS. 10A & B are representative cross-sectional views of another example of the disconnect tool.

Referring additionally now to FIGS. 10A & B, cross-sectional views of another example of the disconnect tool 24 are representatively illustrated. In this example, the abrasive slurry 52 can be diverted to the exterior of the disconnect tool 24, instead of flowing to a bottom hole assembly connected below the disconnect tool.

In FIG. 10A, the disconnect tool 24 is depicted in a run-in configuration. The connectors 32, 34 are used to connect the disconnect tool 24 in a tubular string (such as the drill string 14 in the FIG. 1 system 10). Fluid can then be flowed completely through the disconnect tool 24 via the flow passage 38 and the flow passage 48, which extends completely through the inner mandrel 36 and provides fluid communication between the upper and lower sections of the flow passage 38.

In the run-in configuration of FIG. 10A, the inner mandrel 36 is positioned so that seals 72 carried on the inner mandrel longitudinally straddle openings 74 formed through the outer housing 28. In this position, the inner mandrel 36 blocks flow through the side of the outer housing 28 between the flow passage 38 and the exterior of the disconnect tool 24. One or more shear members 76 releasably secure the inner mandrel 36 against displacement relative to the outer housing 28.

When it is desired to disconnect the upper portion 28*a* of the outer housing 28 from the lower portion 28*b*, the plug 50 is deployed into the flow passage 38 above the disconnect tool 24. The plug 50 eventually engages and seals against the seat 44, in this example formed in an upper end of the inner mandrel 36.

Pressure in the upper section of the flow passage 38 can then be increased, until a sufficient resulting force is produced to shear the shear members 76. When the shear members 76 shear, the force due to the pressure differential across the inner mandrel 36 will cause the inner mandrel to displace relative to the outer housing 28 to the FIG. 10B configuration.

Figure 10B:
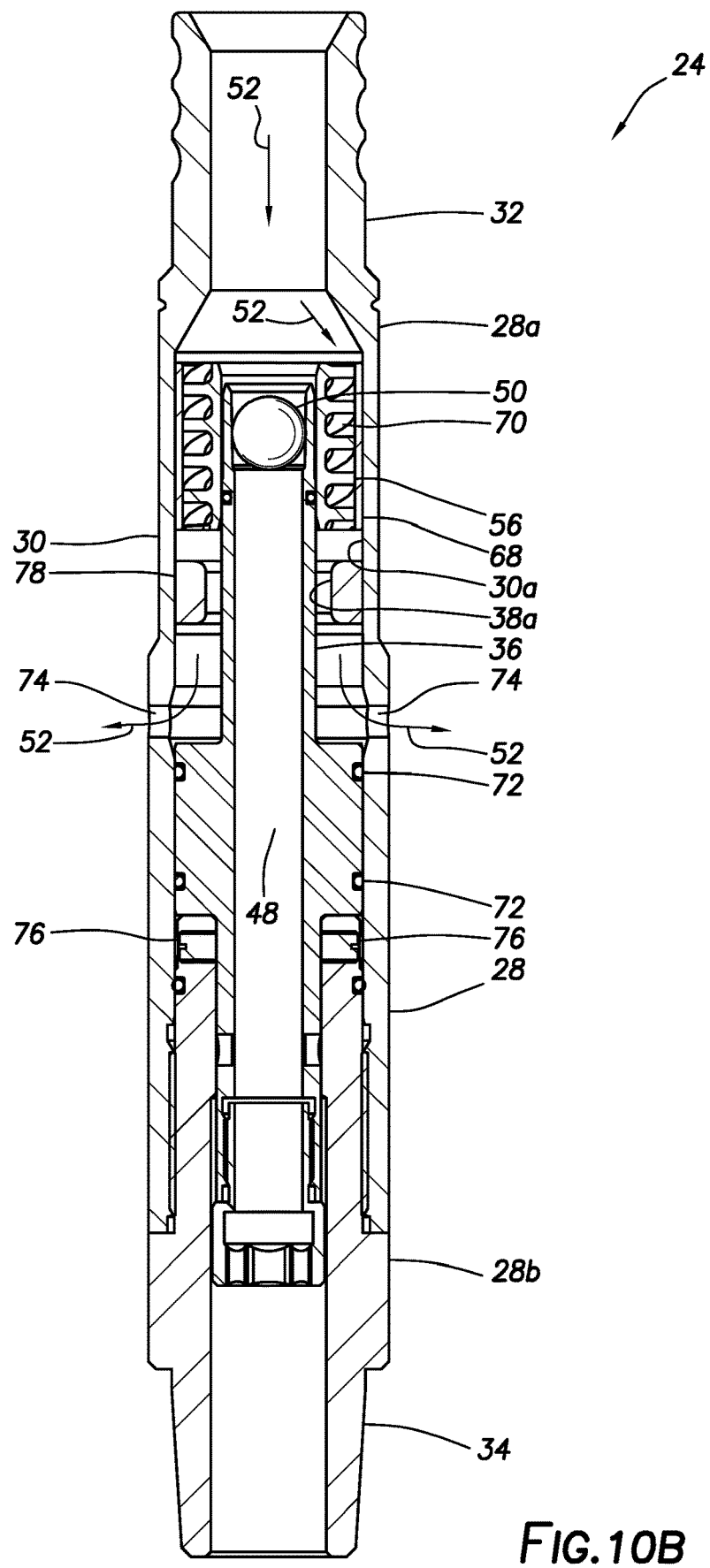

In the FIG. 10B configuration, the inner mandrel 36 no longer blocks flow through the openings 74. Fluid communication is permitted between the upper section of the flow passage 38 and the exterior of the disconnect tool 24 via the openings 74.

The abrasive slurry 52 can be pumped into the upper section of the flow passage 38. The slurry 52 will then flow into the helical passage 70 formed between the inner mandrel 36, the sleeve 68 and the vanes 56. Rotational flow is induced in the abrasive slurry 52 as it passes through the passage 70.

The abrasive slurry 52 then flows into the section of the reduced cross-section area 30 having the inner surface 30*a*. As in the FIG. 9 example, the FIGS. 10A & B inner surface 30*a* has a larger inner diameter D as compared to an inner diameter d of the section 38*a* of the flow passage 38.

Because the section 38*a* of the flow passage 38 has a smaller inner diameter d, in order to pass into the section 38*a*, the angular velocity of the slurry 52 will increase (as required by the principle of conservation of angular momentum). This angular acceleration of the slurry 52 causes it to impinge more forcefully against the inner surface 30*a*, thereby eroding through the reduced cross-section area 30 in a reduced amount of time.

The reduced cross-section area 30 may be eroded through completely or partially by the abrasive slurry 52. If the reduced cross-section area 30 is partially eroded, a force may be applied to the upper portion 28*a* of outer housing 28 (for example by picking up at surface on the tubular string connected to the upper connector 32), in order to fully part the reduced cross-section area.

In the FIGS. 10A & B example, the section 38*a* of the flow passage 38 is formed in a separate ring 78 secured in the outer housing 28. In other examples, the ring 78 could be integrally formed with the outer housing 28, or the reduced inner diameter d could be formed in another structure.

If it is desired to have multiple disconnect tools 24 connected in a tubular string, the plugs 50 and seats 44 of the respective disconnect tools could have different dimensions, so that a particular disconnect tool could be selected for actuation (in order to part the tubular string at a corresponding position) by selecting an appropriately dimensioned plug to engage the seat of the particular selected disconnect tool. The dimensions of the seats 44 of the disconnect tools 24 could successively decrease in a direction toward a distal end of the tubular string in the well.

Figure 11A:
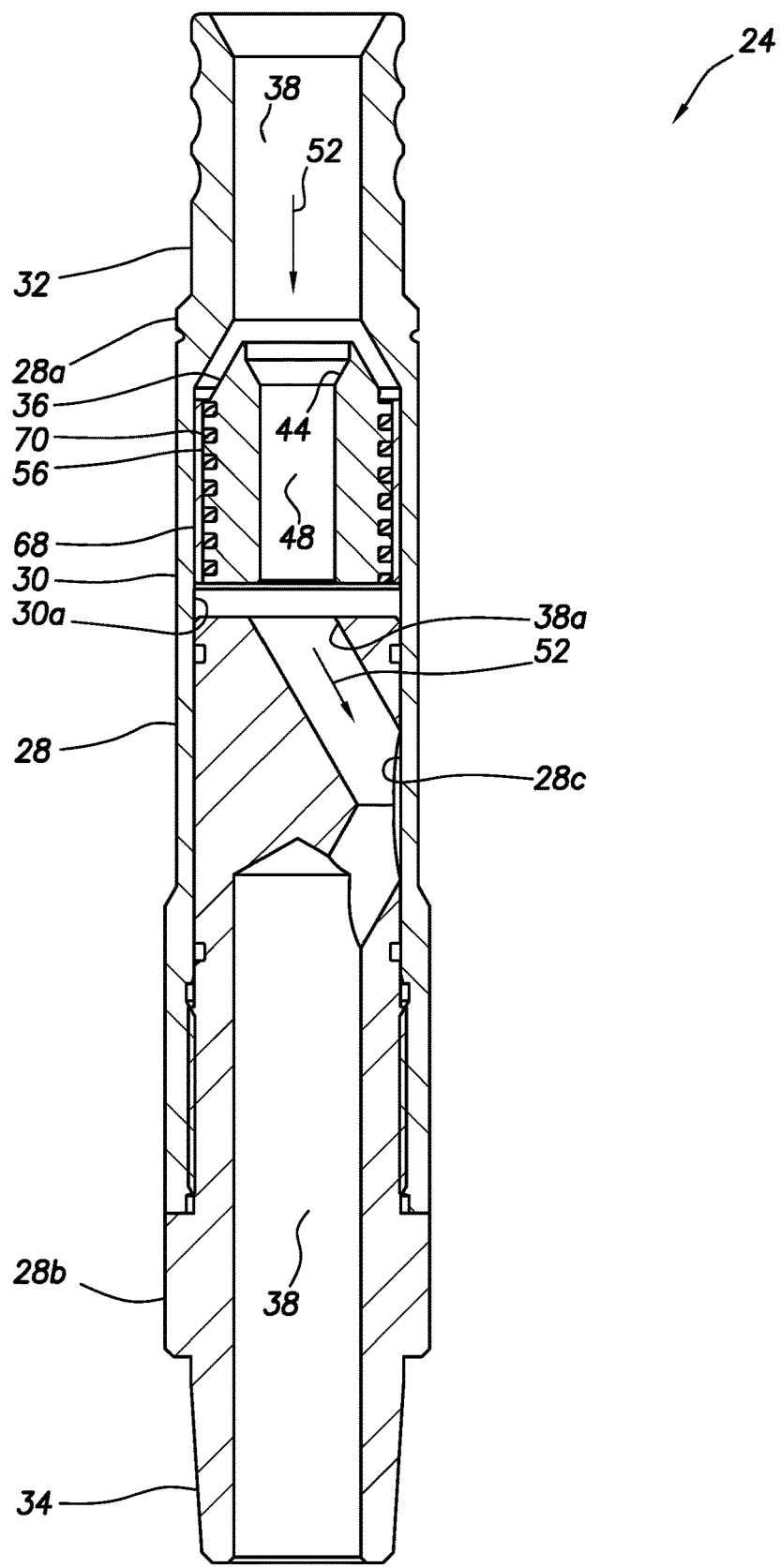
FIGS. 11A & B are representative cross-sectional views of another example of the disconnect tool.

Referring additionally now to FIGS. 11A & B, cross-sectional views of another example of the disconnect tool 24 are representatively illustrated. In this example, the abrasive slurry 52 may be flowed through the disconnect tool 24 before it is desired to part the outer housing 28. The flow of the abrasive slurry 52 is used to erode an opening 74 through a side of the outer housing 28 prior to parting the outer housing.

In FIG. 11A, the disconnect tool 24 is depicted with the abrasive slurry 52 flowing completely through the flow passage 38. This step is performed after the disconnect tool 24 is connected in a tubular string and installed in a well. When it is desired to utilize the disconnect tool 24, the abrasive slurry 52 is flowed through the flow passage 38.

The abrasive slurry 52 flows from an upper section of the flow passage 38 and through the flow passage 48 in the inner mandrel 36. From the flow passage 48, the abrasive slurry 52 flows into the section 38*a* of the flow passage 38 having a smaller inner diameter d than the inner diameter D of the inner surface 30*a* of the reduced cross-section area 30.

Figure 11B:
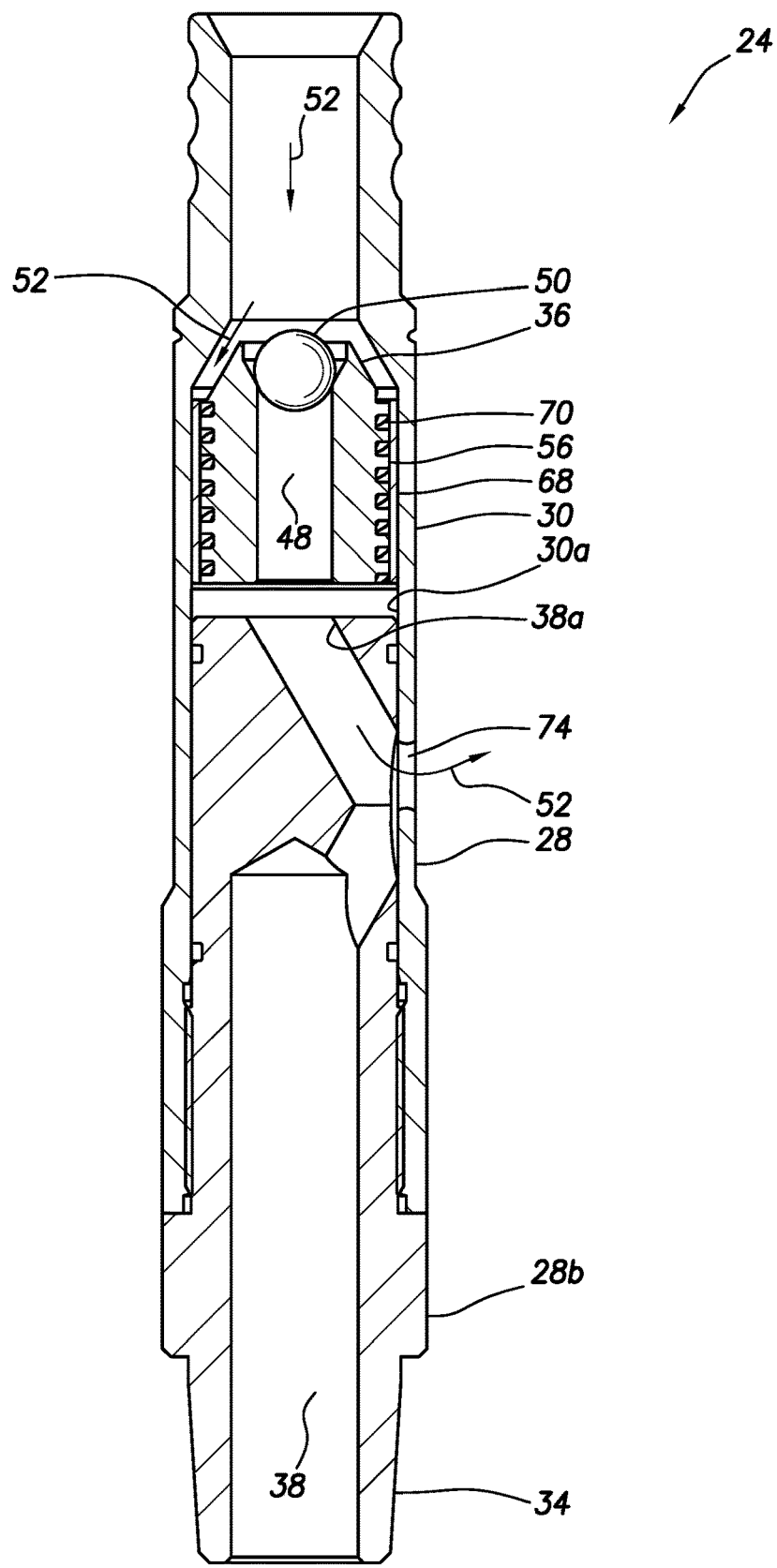

In this example, the section 38*a* of the flow passage 38 is inclined, curved or deviated, so that it directs the abrasive slurry 52 to impinge on an inner surface 28*c* of the outer housing 28. Eventually, the opening 74 is formed through the side of the outer housing 28 (see FIG. 11B), so that fluid communication is permitted between the flow passage 38 and the exterior of the disconnect tool 24. An operator at surface will detect a reduced pressure level in the tubular string after the opening 74 is formed.

When it is desired to part the outer housing 28, the plug 50 is deployed and the abrasive slurry 52 is pumped into the upper section of the flow passage 38. The plug 50 eventually engages and seals against the seat 44, thereby preventing flow through the flow passage 48 in the inner mandrel 36.

The slurry 52 is thereby diverted to flow into the helical passage 70 formed between the inner mandrel 36, the sleeve 68 and the vanes 56. Rotational flow is induced in the abrasive slurry 52 as it flows through the passage 70.

The abrasive slurry 52 then flows into the section of the reduced cross-section area 30 having the inner surface 30a. As in the FIGS. 9-10B examples, the FIGS. 11A & B inner surface 30a has a larger inner diameter D as compared to an inner diameter d of the section 38a of the flow passage 38.

Because the section 38a of the flow passage 38 has a smaller inner diameter d, in order to pass into the section 38a, the angular velocity of the slurry 52 will increase (as required by the principle of conservation of angular momentum). This angular acceleration of the slurry 52 causes it to impinge more forcefully against the inner surface 30a, thereby eroding through the reduced cross-section area 30 in a reduced amount of time.

The reduced cross-section area 30 may be eroded through completely or partially by the abrasive slurry 52. If the reduced cross-section area 30 is partially eroded, a force may be applied to the upper portion 28a of outer housing 28 (for example by picking up at surface on the tubular string connected to the upper connector 32), in order to fully part the reduced cross-section area.

Figure 12:
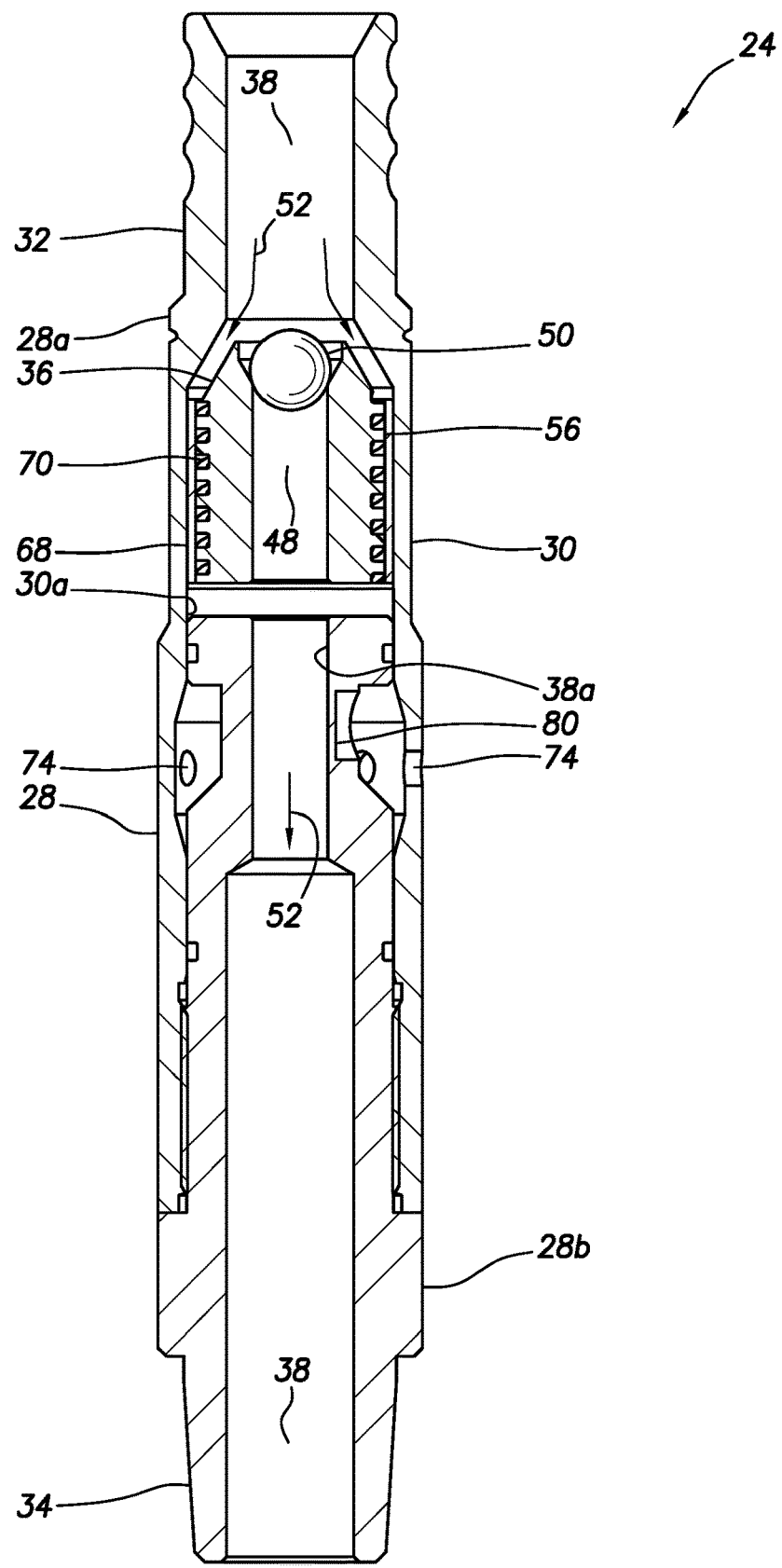
FIG. 12 is a representative cross-sectional view of another example of the disconnect tool.

Referring additionally now to FIG. 12, a cross-sectional view of another example of the disconnect tool 24 is representatively illustrated. The FIG. 12 example is similar in many respects to the FIGS. 11A & B example. However, in the FIG. 12 example, fluid communication between the flow passage 38 and the exterior of the disconnect tool 24 is established after the plug 50 is deployed.

As depicted in FIG. 12, a relatively easily erodible barrier 80 is interposed between the flow passage 38 and openings 74 formed in the side of the outer housing 28. When the barrier 80 is opened by erosion, fluid communication will be permitted between the flow passage 38 and the exterior of the disconnect tool 24.

When it is desired to part the outer housing 28, the plug 50 is deployed and the abrasive slurry 52 is pumped into the upper section of the flow passage 38. The plug 50 eventually engages and seals against the seat 44, thereby preventing flow through the flow passage 48 in the inner mandrel 36.

The slurry 52 is thereby diverted to flow into the helical passage 70 formed between the inner mandrel 36, the sleeve 68 and the vanes 56. Rotational flow is induced in the abrasive slurry 52 as it flows through the passage 70.

The abrasive slurry 52 then flows into the section of the reduced cross-section area 30 having the inner surface 30a. As in the FIGS. 9-11B examples, the FIG. 12 inner surface 30a has a larger inner diameter D as compared to an inner diameter d of the section 38a of the flow passage 38.

Because the section 38a of the flow passage 38 has a smaller inner diameter d, in order to pass into the section 38a, the angular velocity of the slurry 52 will increase (as required by the principle of conservation of angular momentum). This angular acceleration of the slurry 52 causes it to impinge more forcefully against the inner surface 30a, thereby eroding through the reduced cross-section area 30 in a reduced amount of time.

However, the reduced cross-section area 30 and the erodible barrier 80 are configured so that the erodible barrier is eroded through before the reduced cross-section area 30 is eroded through. The erodible barrier 80 may be made of an easily erodible material, such as a relatively soft, easily abraded material.

Thus, fluid communication is permitted between the flow passage 38 and the exterior of the disconnect tool 24 prior to the outer housing 28 being parted.

In other examples, the erodible barrier 80 could be eroded through prior to deploying the plug 50 (as in the FIGS. 11A & B example). In addition, the FIGS. 11A & B example could be configured so that the outer housing 28 is eroded through to form the opening 74 after the plug 50 is deployed, and prior to parting the outer housing.

The reduced cross-section area 30 may be eroded through completely or partially by the abrasive slurry 52. If the reduced cross-section area 30 is partially eroded, a force may be applied to the upper portion 28a of outer housing 28 (for example by picking up at surface on the tubular string connected to the upper connector 32), in order to fully part the reduced cross-section area.

In any of the FIGS. 1-12 examples described above, it is not necessary for the outer housing 28 to include a reduced cross-section area 30 that is eroded through by the abrasive slurry. Portions of the outer housing 28 that do not have a reduced cross-section area can be cut through using the principles described herein.

As depicted in FIG. 12, the inner mandrel 36, with the vanes 56 and sleeve 68 are installed in the disconnect tool 24 prior to connecting the disconnect tool in a tubular string and installing the tubular string in a well. In other examples, the inner mandrel 36, vanes 56 and sleeve 68 could be included in a disconnect assembly that is separately deployed into the tubular string after the tubular string is installed in the well (as in the FIGS. 8A & B example described above). In any of the disconnect tool 24 examples described herein, a separate disconnect assembly can be installed in a tubular or an outer housing connected in a tubular string, after the tubular string has been installed in a well.

Referring additionally now to FIGS. 13A-D, cross-sectional views of another example of the disconnect tool 24 are representatively illustrated. In this example, the disconnect tool 24 can be used to part a tubular 22 at any position along a tubular string. It is not necessary to connect a separate outer housing in the tubular string.

The disconnect tool 24 is positioned at a desired location along the length of the tubular string by means of an anchor 82 that can be set proximate the desired location. When set, the anchor 82 secures a seat 84 at the desired location and prevents relative displacement between the seat and the tubular 22 in at least one longitudinal direction (downhole in this example).

Figure 13A:
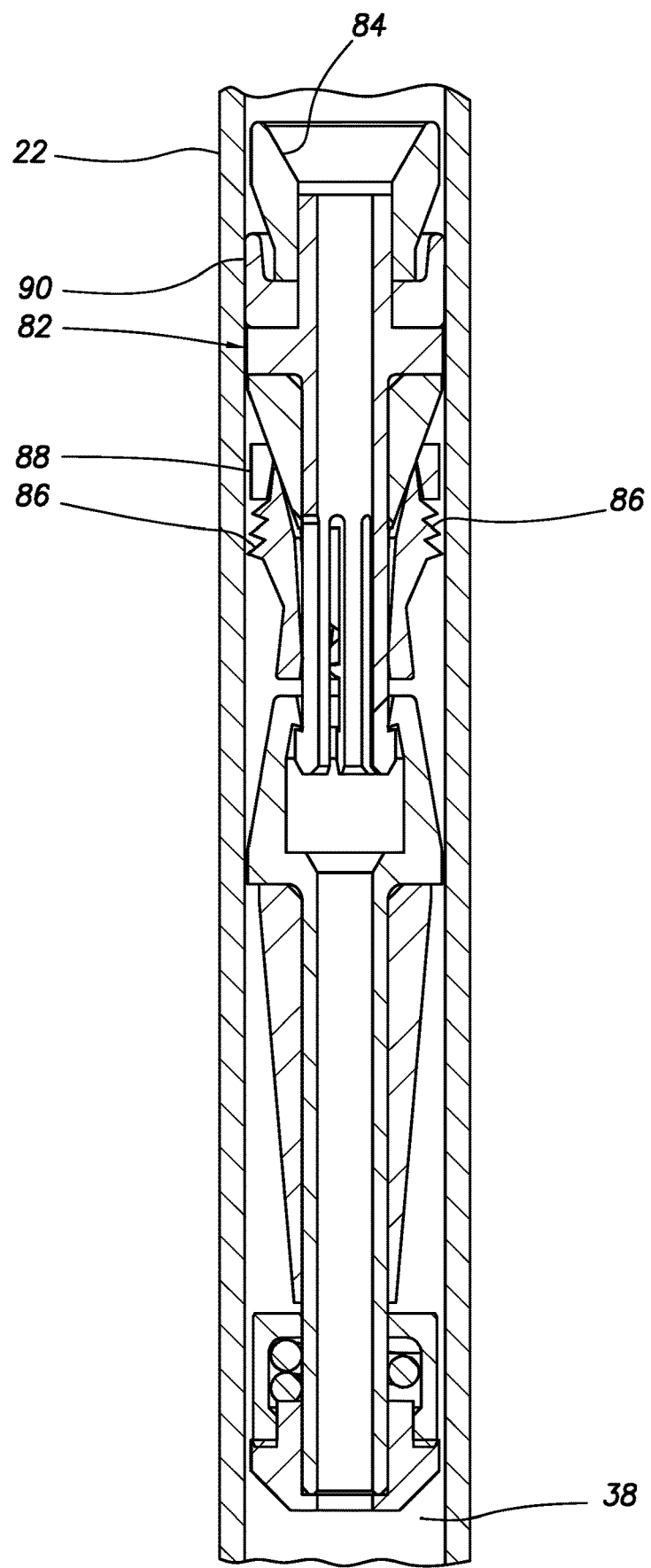
FIGS. 13A-D are representative cross-sectional views of another example of the disconnect tool.

In FIG. 13A, the anchor 82 is deployed into the tubular string in an unset configuration. In this configuration, slips 86 of the anchor 82 are prevented from engaging an inner surface of the tubular 22 by a degradable retainer 88.

A cup seal 90 on the anchor 82 sealingly engages the inner surface of the tubular string. In one example, the anchor 82 can be displaced through the tubular string to the desired location for parting the tubular 22 by introducing a predetermined volume of fluid into the tubular string after the anchor is deployed into the tubular string.

The predetermined volume of fluid corresponds to a distance along the tubular string and a flow area of the flow passage 38 through the tubular string, with the specific correspondence being empirically determined. Although in the FIGS. 13A-D example some fluid flow through the anchor 82 is permitted, the anchor presents a significant restriction to flow through the tubular string, so that a pressure differential can be created across the anchor, allowing the anchor to be displaced through the tubular string to the desired location for parting the tubular 22.

Figure 13B:
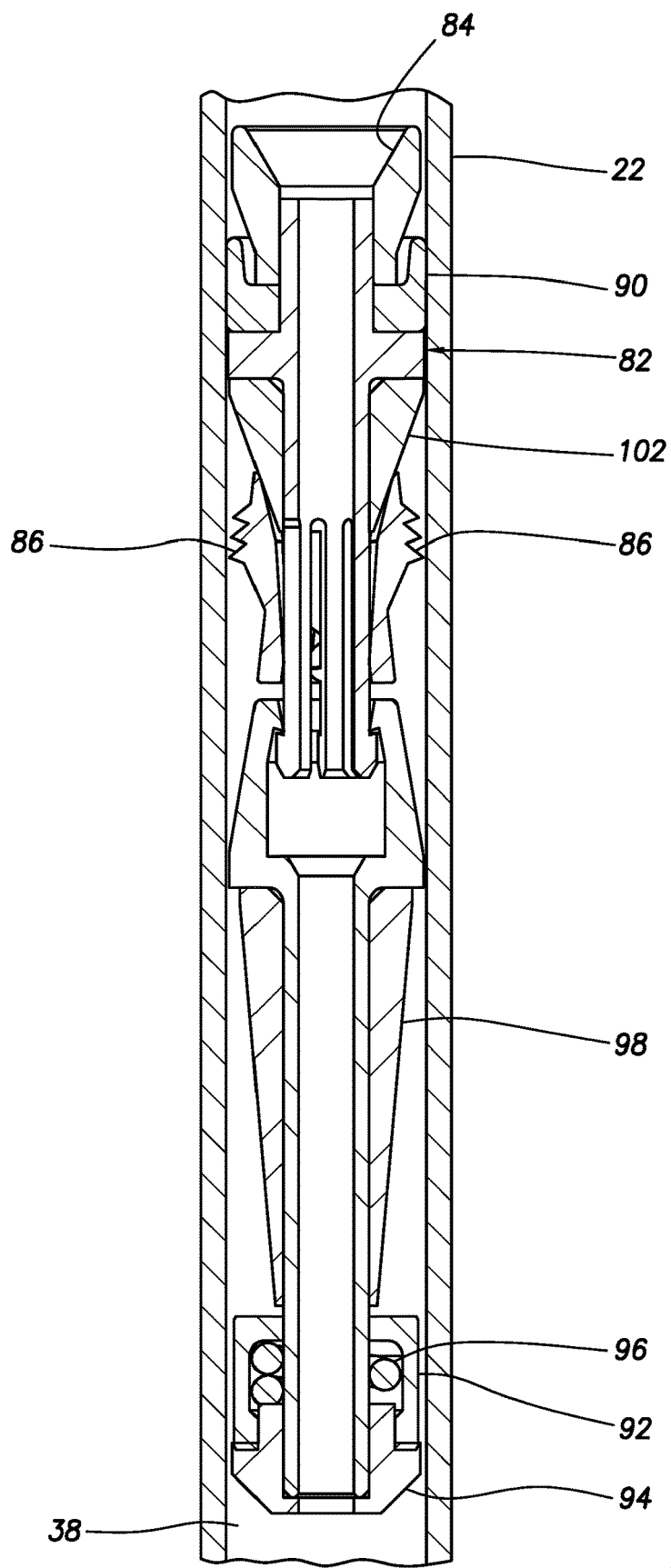

In FIG. 13B, the anchor 82 is positioned at (e.g., just below) the desired location for parting the tubular 22. The retainer 88 has degraded, so that the retainer no longer prevents the slips 86 from engaging the inner surface of the tubular 22.

The retainer 88 may dissolve, disperse, disappear or otherwise degrade in response to any stimulus or other condition. For example, the retainer 88 could melt when exposed to downhole temperatures, the retainer could dissolve in response to contact with a particular fluid pH or chemical composition in the well. The fluid that causes the retainer 88 to degrade could already be present in the well, or could be introduced into the well when it is desired to set the anchor 82.

Another degradable retainer 92 retains a helical-shaped prop 96 adjacent a nose 94 of the anchor 82. A conical ramp 98 is positioned near the retainer 92 and prop 96 so that, when the retainer degrades, the prop will contact the ramp (e.g., in response to downward displacement of the anchor 82 relative to the tubular 22), which will deflect the prop outward into gripping engagement with the inner surface of the tubular 22.

Figure 13C:
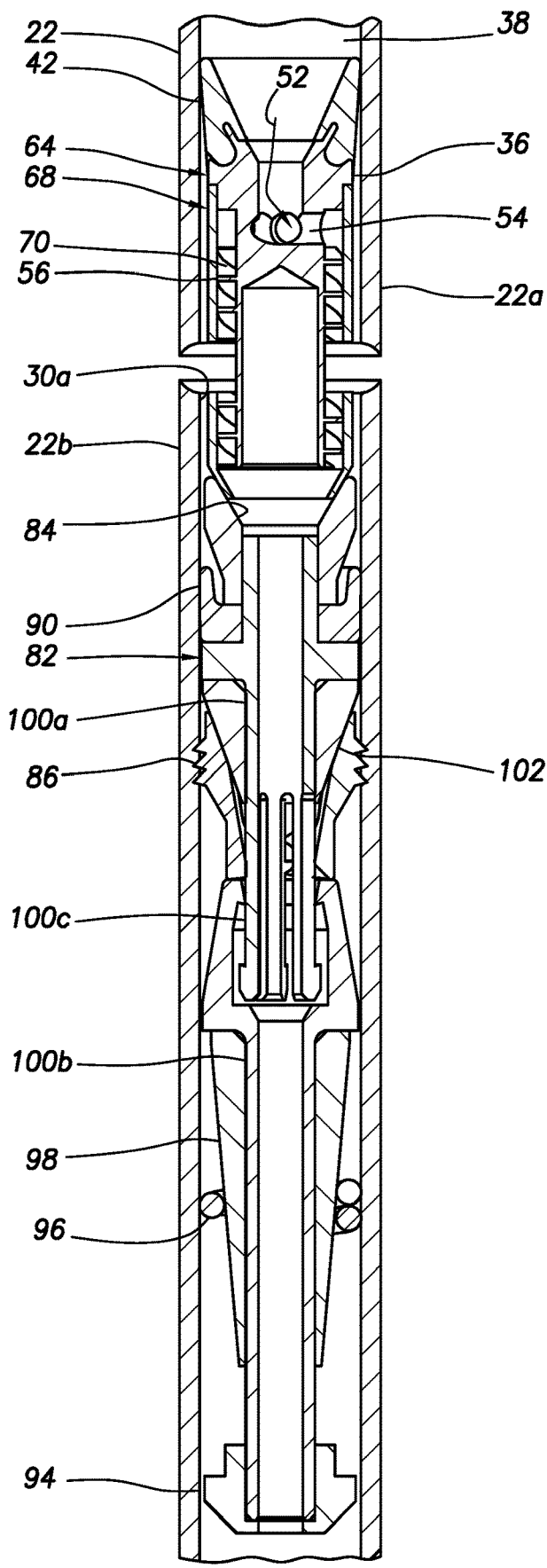

In FIG. 13C, the anchor 82 is depicted with the retainer 92 degraded and the prop 96 wedged between the ramp 98 and the inner surface of the tubular 22. Further downward displacement of the ramp 98 relative to the tubular 22 is thereby prevented.

The ramp 98 is carried on a lower mandrel section 100b of the anchor 82. The lower mandrel section 100b is connected to an upper mandrel section 100a via a slip joint 100c. The slip joint 100c permits limited relative longitudinal displacement between the upper and lower mandrel sections 100a,b.

After the prop 96 has grippingly engaged the inner surface of the tubular 22, any subsequent downward displacement of the upper mandrel section 100a will cause the slip joint 100c to longitudinally compress. As depicted in FIG. 13C, the upper mandrel section 100a has displaced downward relative to the lower mandrel section 100b, thereby compressing the slip joint 100c and displacing a conical wedge 102 carried on the upper mandrel section 100a into engagement with the slips 86.

The engagement between the slips 86 and the wedge 102 causes the slips 86 to deflect outward into gripping engagement with the inner surface of the tubular 22. At this point, the seat 84 is positioned at a particular location along the tubular 22, and the anchor 82 is prevented from displacing further downward in the tubular. In some examples, the slips 86 and other components of the anchor 82 could be configured to prevent displacement of the anchor in both longitudinal directions when the anchor is set.

In the FIG. 13C example, a disconnect assembly 64 (similar to the disconnect assembly depicted in FIGS. 8A & B) is deployed into the flow passage 38 and is engaged with the seat 84 on the anchor 82. This engagement positions the disconnect assembly 64 at the desired location for parting the tubular 22.

The abrasive slurry 52 is pumped into the flow passage 38 above the disconnect assembly 64. The slurry 52 flows into the disconnect assembly 64, and flows via the ports 54 into the helical passage 70. The helical passage 70 induces helical, vortical, spiral or rotational flow in the slurry 52.

At a gap in the sleeve 68, the rotating slurry 52 can impinge on an inner surface 30a of the tubular 22. The slurry 52 eventually erodes through the tubular 22 at the desired location for parting the tubular. Note that the slurry 52 may need to enter a smaller diameter after the gap in the sleeve 68 (e.g., to re-enter the helical passage 70 at an opposite end of the gap in the FIG. 13C example), which can increase its angular velocity and result in an increased rate of erosion of the tubular 22.

The tubular 22 may be eroded through completely or partially by the abrasive slurry 52. If the tubular 22 is partially eroded, a force may be applied to an upper section 22a of the tubular 22 (for example by picking up at surface on the tubular string 14), in order to fully part the tubular.

In FIG. 13C, the tubular 22 has been parted by the erosive action of the abrasive slurry 52. An upper section 22a of the tubular 22 can now be retrieved from the well, apart from a lower section 22b of the tubular. The disconnect assembly 64 and the anchor 82 remain in the lower section 22b of the tubular 22.

In cases where it would be desirable to be able to conveniently fish the disconnect assembly 64 and the anchor 82 out of the well, either prior to or after the tubular 22 has been parted, the anchor can be appropriately configured to be readily retrieved.

Figure 13D:
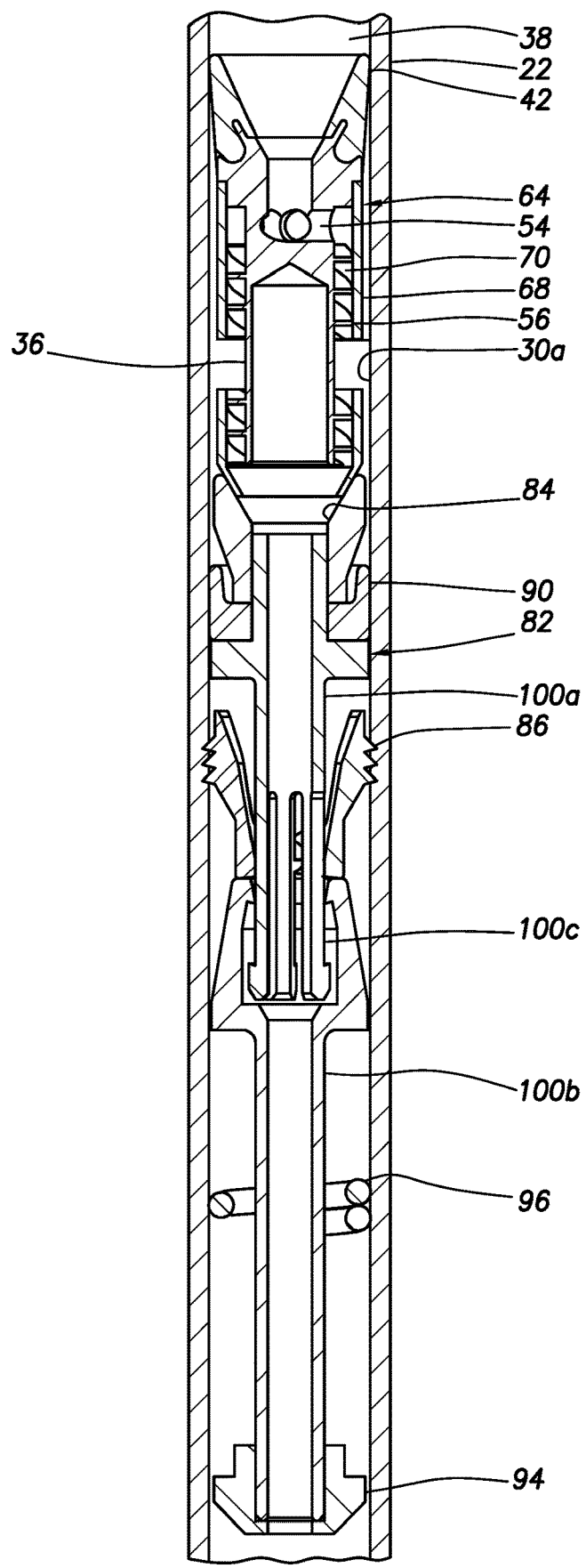

In this example, the ramp 98 and the wedge 102 can be degradable, so that the anchor 82 can be unset downhole. As depicted in FIG. 13D, the ramp 98 and the wedge 102 have degraded, so that the slips 86 can now disengage from the inner surface of the tubular 22, and the prop 96 is no longer preventing displacement of the lower mandrel section 100b relative to the tubular. The disconnect assembly 64 and the anchor 82 can now be retrieved to the surface, together or separately.

As with the retainers 88, 92, the ramp 98 and wedge 102 may comprise any material that can dissolve, disperse, disappear or otherwise degrade downhole. Preferably, the ramp 98 and wedge 102 are configured to degrade after the retainers 88, 92 degrade. For example, the ramp 98 and wedge 102 could be designed to degrade slower than the retainers 88, 92 in response to exposure to downhole conditions. As another example, the ramp 98 and wedge 102 could be designed to degrade in response to exposure to a particular fluid or chemical composition that is introduced into the well an appropriate amount of time after the retainers 88, 92 have degraded.

In the FIGS. 2-9 & 11A-13D examples described above, the abrasive slurry 52 is flowed completely through the disconnect tool 24. If a bottom hole assembly is connected below the disconnect tool 24, the abrasive slurry 52 could flow from the disconnect tool, and into and through the bottom hole assembly.

In some situations in which it is desired to prevent or reduce such flow of the abrasive slurry 52 into the bottom hole assembly, a circulating tool could be connected below the disconnect tool 24 (e.g., between the disconnect tool and the bottom hole assembly). The circulating tool could be opened to thereby permit fluid communication between the flow passage 38 and the exterior of the tubular string (such as, the annulus 26 in the FIG. 1 system 10), so that a substantial portion (if not all) of the slurry 52 will flow to the exterior of the tubular string, instead of to the bottom hole assembly, after flowing through the disconnect tool 24. The circulating tool could also prevent fluid communication to the flow passage below the circulating tool, so that none of the slurry 52 flows into the bottom hole assembly. A suitable commercially available circulating tool is a Circulating Sub marketed by Thru Tubing Solutions, Inc. of Oklahoma City, Okla. USA.

In the FIGS. 6-13D examples described above, the outer housing 28 may be eroded through by the abrasive slurry 52 at any location (such as, at, between or downstream of, the vanes 56). The outer housing 28 could even be eroded upstream of the vanes 56 (for example, opposite outlets of the ports 54 in the FIG. 6 example). Thus, the scope of this disclosure is not limited to any particular location at which the outer housing 28 is eroded by the abrasive slurry 52.

Although the disconnect tool 24 is described above as it may be used with a drilling operation, the scope of this disclosure is not limited to use with drilling operations. For example, the disconnect tool 24 could be used with other operations (such as, completion, production, stimulation or injection operations), and could be connected in tubular strings other than a drill string.

It may now be fully appreciated that the above disclosure provides significant advancements to the arts of design, constructing and utilizing disconnect tools. In various examples described above, the disconnect tool 24 can be used to conveniently part a tubular string using an abrasive slurry 52 to erode through a tubular 22 or an outer housing 28 connected in the tubular string.

The above disclosure provides to the art a system 10 for use with a subterranean well. In one example, the system 10 comprises a disconnect tool 24 connected as part of a tubular string 14, the disconnect tool 24 comprising an outer housing 28, and an inner mandrel 36 in the outer housing 28. An abrasive slurry 52 is directed to flow through the tubular string 14 and from the inner mandrel 36 to an annulus 40 between the inner mandrel 36 and the outer housing 28. The abrasive slurry 52 erodes (partially or completely) through the outer housing 28.

In any of the examples described herein:

The abrasive slurry 52 may flow through nozzles 46 in the inner mandrel 36, and the nozzles 46 may increase a flow velocity of the abrasive slurry 52. The nozzles 46 may direct the slurry 52 to impinge on an inner surface 30a of a reduced cross-section area 30 of the outer housing 28.

Rotational flow of the abrasive slurry 52 may be induced in the annulus 40. One or more vanes 56 positioned in the annulus 40 may induce the rotational flow of the abrasive slurry 52 in the annulus 40. One or more nozzles 46 positioned in the inner mandrel 36 may induce the rotational flow of the abrasive slurry 52 in the annulus 40.

A rotational velocity of the abrasive slurry 52 may be increased at a location where the abrasive slurry 52 erodes through the outer housing 28. The location may be at a change in inner diameter (e.g., D to d) in the disconnect tool 24. The location may be at a change in inner diameter in the outer housing 28.

A plug 50 may be installed in the inner mandrel 36 downhole, and the plug 50 may divert the abrasive slurry 52 to impinge on an inner surface 30a of the outer housing 28 of the disconnect tool 24.

Fluid communication may be permitted between the flow passage 38 and an exterior of the disconnect tool 24 prior to separation of the outer housing 28 by the erosion through the outer housing 28.

A plug 50 may be received in the inner mandrel 36, and the inner mandrel 36 may displace to a position in which the inner mandrel 36 does not block fluid flow through openings 74 in a side of the outer housing 28.

The abrasive slurry 52 may be diverted to impinge on an inner surface 30a of the outer housing 28 to thereby permit the fluid communication between the flow passage 38 and the exterior of the disconnect tool 24.

A plug 50 may be installed in the inner mandrel 36 downhole, and the plug 50 may divert the abrasive slurry 52 and rotational flow may be thereby induced in the abrasive slurry 52.

The inner mandrel 36 may be part of a disconnect assembly 64 deployed into the outer housing 28 after the tubular string 14 is installed in the well. The disconnect assembly 64 may comprise vanes 56 formed externally on the inner mandrel 36. The vanes 56 may induce rotational flow in the abrasive slurry 52.

A method of parting a tubular string 14 in a subterranean well is also provided to the art by the above disclosure. In one example, the method comprises: installing the tubular string 14 in the well; then deploying a disconnect assembly 64 into the tubular string 14; and flowing an abrasive slurry 52 through the disconnect assembly 64, thereby parting the tubular string 14.

In any of the examples described herein:

The deploying step may include the disconnect assembly 64 engaging an outer housing 28 connected in the tubular string 14, thereby positioning the disconnect assembly 64 at a desired location for parting the tubular string 14.

The method may include deploying an anchor 82 into the tubular string 14, and the anchor 82 grippingly engaging an inner surface of a tubular 22 of the tubular string 14. The anchor 82 may be deployed into the tubular string 14 before the disconnect assembly 64 is deployed into the tubular string 14.

The disconnect assembly deploying step may include the disconnect assembly 64 engaging the anchor 82 in the tubular string 14, thereby positioning the disconnect assembly 64 at a desired location for parting the tubular string 14.

The abrasive slurry flowing step may include inducing rotational flow of the abrasive slurry 52. The rotational flow inducing step may include flowing the abrasive slurry 52 through a helical flow passage 70. The tubular string 14 eroding step may include decreasing a diameter (e.g., D to d) of the rotational flow of the abrasive slurry 52.

The method may include providing fluid communication between an inner flow passage 38 of the tubular string 14 and an exterior of the tubular string 14 prior to parting the tubular string 14.

The method may include parting the tubular string by applying a tensile force to the tubular string after the eroding step.

A disconnect tool 24 for use in a subterranean well is also described above. In one example, the disconnect tool 24 comprises a rotational flow structure (e.g., the vanes 56) configured to induce rotational flow; and an inner diameter decrease (e.g., D to d) downstream of the rotational flow structure.

In any of the examples described herein:

The disconnect tool 24 may include an outer housing 28 having a reduced cross-section area 30. The inner diameter decrease may be aligned with the reduced cross-section area 30.

The rotational flow structure may comprise a helical flow passage 70.

A plug 50 may be configured to engage a seat 44 of the disconnect tool 24 and thereby divert flow to the rotational flow structure.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," "upward," "downward," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A system for use with a subterranean well, the system comprising:
    a disconnect tool comprising an outer housing which is connected longitudinally between portions of a tubular string, and the disconnect tool further comprising an inner mandrel positioned within the outer housing, whereby the outer housing and the inner mandrel displace with the tubular string as the tubular string is inserted into the well,
    in which an abrasive slurry is directed to flow through the tubular string and from a flow passage of the tubular string to an annulus between the inner mandrel and the outer housing, and the abrasive slurry erodes through the outer housing.

2. The system of claim 1, in which the abrasive slurry flows through nozzles in the inner mandrel, and the nozzles increase a flow velocity of the abrasive slurry.

3. The system of claim 2, in which the nozzles direct the slurry to impinge on an inner surface of a reduced cross-section area of the outer housing.

4. The system of claim 1, in which rotational flow of the abrasive slurry is induced in the annulus.

5. The system of claim 4, in which one or more vanes positioned in the annulus induce the rotational flow of the abrasive slurry in the annulus.

6. The system of claim 4, in which one or more nozzles positioned in the inner mandrel induce the rotational flow of the abrasive slurry in the annulus.

7. The system of claim 4, in which a rotational velocity of the abrasive slurry is increased at a location where the abrasive slurry erodes through the outer housing.

8. The system of claim 7, in which the location is at a change in inner diameter in the disconnect tool.

9. The system of claim 7, in which the location is at a change in inner diameter in the outer housing.

10. The system of claim 1, in which a plug is installed in the inner mandrel downhole, and the plug diverts the abrasive slurry to impinge on an inner surface of the outer housing of the disconnect tool.

11. The system of claim 1, in which fluid communication is permitted between the flow passage and an exterior of the disconnect tool prior to separation of the outer housing by the erosion through the outer housing.

12. The system of claim 11, in which a plug is received in the inner mandrel, and the inner mandrel displaces to a position in which the inner mandrel does not block fluid flow through openings in a side of the outer housing.

13. The system of claim 11, in which the abrasive slurry is diverted to impinge on an inner surface of the outer housing to thereby permit the fluid communication between the flow passage and the exterior of the disconnect tool.

14. The system of claim 13, in which a plug is installed in the inner mandrel downhole, and the plug diverts the abrasive slurry and rotational flow is thereby induced in the abrasive slurry.

15. The system of claim 1, in which the disconnect tool comprises vanes formed externally on the inner mandrel.

16. The system of claim 15, in which the vanes induce rotational flow in the abrasive slurry.

* * * * *